US010523537B2

(12) United States Patent
Turow et al.

(10) Patent No.: US 10,523,537 B2
(45) Date of Patent: Dec. 31, 2019

(54) DEVICE STATE MANAGEMENT

(71) Applicant: Amazon Technologies, Inc., Seattle, WA (US)

(72) Inventors: Jonathan I. Turow, Seattle, WA (US); Calvin Yue-Ren Kuo, Irvine, CA (US); James Christopher Sorenson, III, Seattle, WA (US); Alan Conrad Rawcliffe, Seattle, WA (US); Shyam Krishnamoorthy, Redmond, WA (US); Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 14/788,356

(22) Filed: Jun. 30, 2015

(65) Prior Publication Data
US 2018/0091391 A1    Mar. 29, 2018

(51) Int. Cl.
*H04L 12/26* (2006.01)
*G06F 16/23* (2019.01)
*H04L 12/24* (2006.01)

(52) U.S. Cl.
CPC ............ *H04L 43/045* (2013.01); *G06F 16/23* (2019.01); *H04L 41/06* (2013.01); *H04L 43/0817* (2013.01)

(58) Field of Classification Search
CPC .................... H04L 43/045; G06F 17/30345
See application file for complete search history.

(56) References Cited

U.S. PATENT DOCUMENTS

| | | |
|---|---|---|
| 6,760,343 B1 | 7/2004 | Krishnamurthy et al. |
| 7,411,975 B1 | 8/2008 | Mohaban |
| 7,577,722 B1* | 8/2009 | Khandekar ......... G06F 9/45558 709/220 |
| 7,702,801 B1 | 4/2010 | Kyle et al. |
| 7,890,084 B1 | 2/2011 | Dudziak et al. |
| 8,296,370 B2 | 10/2012 | Adams et al. |

(Continued)

OTHER PUBLICATIONS

International Patent Application No. PCT/US2016/040176; Int'l Preliminary Report on Patentability; dated Jan. 11, 2018; 11 pages.

(Continued)

*Primary Examiner* — Michael A Keller
(74) *Attorney, Agent, or Firm* — BakerHostetler

(57) ABSTRACT

A computing environment is disclosed that receives from devices requests directed toward services accessible in the environment, and that forwards communications from services in the environment to devices registered with the environment. During a registration process at the environment, devices are assigned a device identifier that is used to identify and authenticate each particular device and requests communicated from and to the device via the environment. The computing environment maintains state information for each device that has been registered with the system. As the device interacts with the system, the state information is updated to reflect the changes in the device. When requests to perform functions are received from devices, the computing environment determines for the particular device and the particular function requested what processing needs to be performed by the environment in response to the request.

20 Claims, 21 Drawing Sheets

(56) References Cited

U.S. PATENT DOCUMENTS

| | | |
|---|---|---|
| 9,094,398 B2 | 7/2015 | Barkie et al. |
| 9,154,955 B1 | 10/2015 | Bertz et al. |
| 9,237,207 B2 | 1/2016 | Makavy et al. |
| 9,730,003 B2 | 8/2017 | Gu et al. |
| 9,756,086 B1 | 9/2017 | McHugh et al. |
| 9,820,314 B2 | 11/2017 | Sidhu et al. |
| 2002/0103931 A1 | 8/2002 | Mott |
| 2002/0184153 A1 | 12/2002 | De Vries |
| 2004/0030887 A1 | 2/2004 | Harrisville-Wolff et al. |
| 2005/0055405 A1* | 3/2005 | Kaminsky ............... H04L 51/04 709/206 |
| 2005/0125496 A1* | 6/2005 | Thuerk ................... H04L 51/04 709/204 |
| 2007/0088836 A1 | 4/2007 | Tai et al. |
| 2007/0276958 A1 | 11/2007 | Curtis |
| 2008/0005119 A1* | 1/2008 | Fernandez ............ G06Q 10/109 |
| 2009/0125591 A1* | 5/2009 | Kirkpatrick ............ H04L 51/04 709/206 |
| 2009/0260064 A1 | 10/2009 | McDowell et al. |
| 2011/0013591 A1 | 1/2011 | Kakumaru |
| 2011/0219229 A1 | 9/2011 | Cholas et al. |
| 2011/0237981 A1 | 9/2011 | Voss |
| 2011/0302253 A1* | 12/2011 | Simpson-Anderson ..................... H04L 51/04 709/206 |
| 2012/0008529 A1 | 1/2012 | Averbuch et al. |
| 2012/0311237 A1* | 12/2012 | Park ................... G06F 12/0246 711/103 |
| 2013/0159487 A1* | 6/2013 | Patel ................... H04L 67/1031 709/223 |
| 2013/0166447 A1 | 6/2013 | Theado et al. |
| 2013/0238785 A1* | 9/2013 | Hawk ................... G06F 9/5072 709/224 |
| 2013/0297752 A1 | 11/2013 | Bhanujan et al. |
| 2013/0312111 A1 | 11/2013 | Carlson et al. |
| 2013/0346504 A1 | 12/2013 | Huang et al. |
| 2014/0016165 A1 | 1/2014 | Ando |
| 2014/0095804 A1 | 4/2014 | Lientz |
| 2014/0181683 A1 | 6/2014 | Lim et al. |
| 2014/0187889 A1 | 7/2014 | Cohen et al. |
| 2014/0192717 A1 | 7/2014 | Liu et al. |
| 2014/0258366 A1 | 9/2014 | L'Heureux et al. |
| 2014/0358934 A1* | 12/2014 | Hirose ............... G06F 17/30445 707/741 |
| 2014/0359148 A1 | 12/2014 | Cherian et al. |
| 2015/0113592 A1 | 4/2015 | Curtis et al. |
| 2015/0113599 A1 | 4/2015 | Curtis et al. |
| 2015/0124827 A1 | 5/2015 | Rangaraman et al. |
| 2015/0134540 A1 | 5/2015 | Law et al. |
| 2015/0169313 A1* | 6/2015 | Katsura .................... G06F 11/00 717/170 |
| 2015/0186931 A1 | 7/2015 | Flake |
| 2015/0277955 A1* | 10/2015 | Iwamatsu ............ G06F 9/45558 718/1 |
| 2015/0278810 A1 | 10/2015 | Ramatchandirane et al. |
| 2015/0310444 A1 | 10/2015 | Chen et al. |
| 2015/0319046 A1 | 11/2015 | Plummer et al. |
| 2015/0356552 A1 | 12/2015 | Thompson et al. |
| 2016/0205097 A1 | 7/2016 | Yacoub et al. |
| 2016/0285891 A1 | 9/2016 | Byers et al. |
| 2016/0352632 A1 | 12/2016 | Nedeltchev et al. |
| 2016/0378337 A1* | 12/2016 | Horspool ............. G06F 3/0659 711/103 |
| 2017/0249181 A1* | 8/2017 | Tsirkin .................... G06F 8/654 |

OTHER PUBLICATIONS

International Patent Application No. PCT/US2016/040176; Int'l Search Report and the Written Opinion; dated Oct. 11, 2016; 14 pages.

* cited by examiner

DEVICE STATE MANAGEMENT

BACKGROUND

Electronic devices pervade seemingly every aspect of society. During the course of a normal day, it is not atypical for a person to use a smart phone, a tablet device, and laptop computer. Our automobiles rely upon electronic systems to control and monitor most every feature and operation. Modern home appliances such as, for example, washers, dryers, and refrigerators are driven and controlled by electronic systems. Manufacturing facilities, building heating and cooling systems, and even farming equipment now rely upon electronic sensors and control systems.

Advancements in communication technologies have allowed for even the simplest of these electronic devices to communicate with other devices and systems. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for purposes of transmitting status and receiving external controls.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
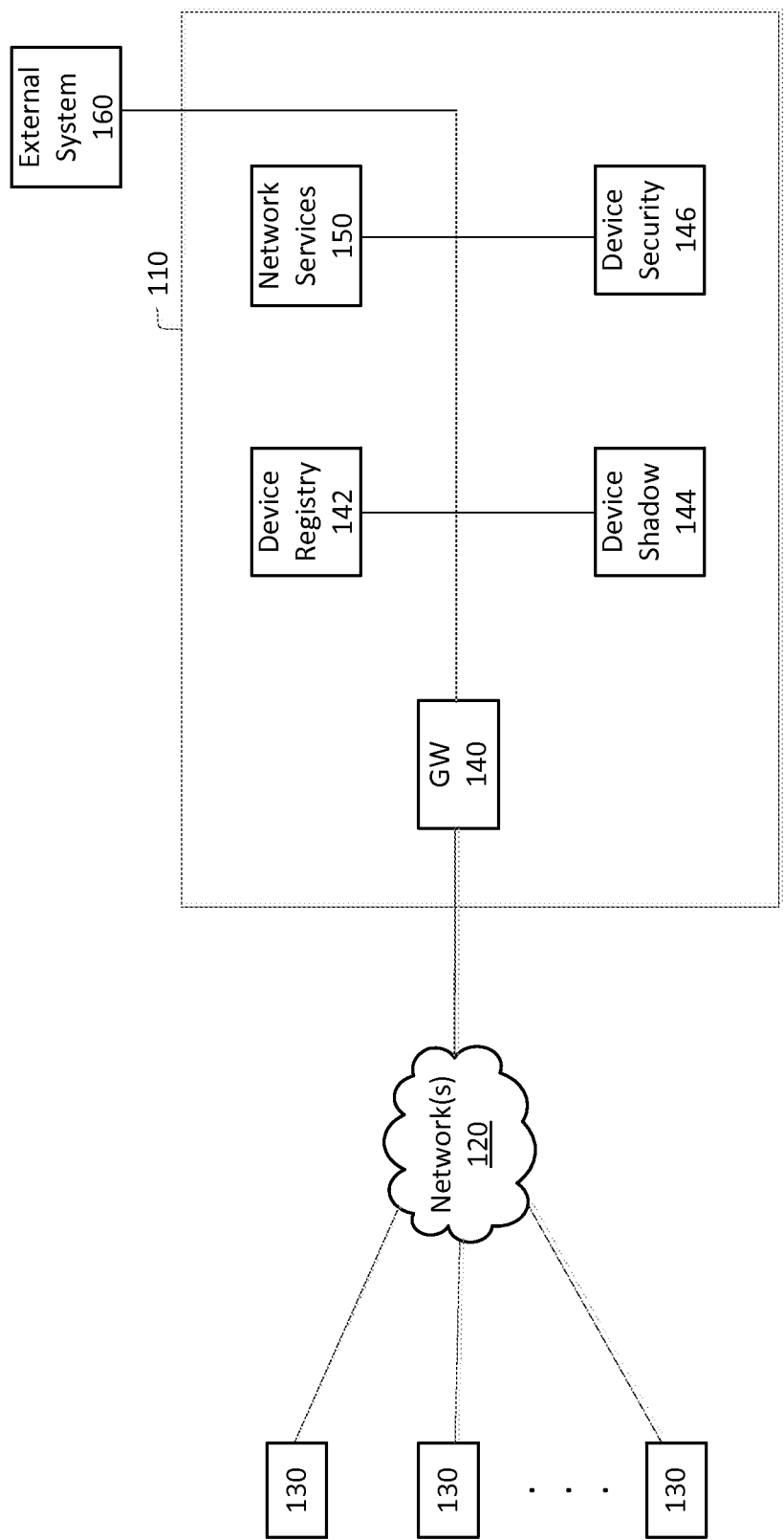
FIG. 1 depicts an example computer networking architecture for providing device access to network services.

The continued application of communication features to the growing installation of electronic devices offers the potential to create an enormous network of addressable devices. Some have referred to this "network" as the Internet of Things (IOT). The possibility of expansive networks of communicatively coupled and addressable devices offers exciting opportunities for the creation of new applications that leverage the devices and the data collected by them.

Applicants disclose herein a device communication environment that allows for devices to communicate with services accessible via the environment and allows for services to communicate with the devices via the environment. Devices that have been registered with the device communication environment may forward requests to the environment. For example, a device such as a dishwasher may communicate a request that its operating characteristics be communicated to a network services server accessible by the environment. A gateway server, which may be one of a plurality of gateway servers, may be identified to process the particular request. The identified gateway sever communicates with a device registry server to identify an executable function that corresponds to the request. For example, the device registry server may identify a particular function executable on a particular network service that corresponds to the particular request to communicate operating characteristics by the particular dishwasher The gateway server requests that the identified function be communicated to the appropriate network service.

Requests to control or communicate with a device may be received at a device shadow server from within the environment. For example, a request to turn on the dishwasher may be received at a device shadow server within the environment. The device shadow server communicates with the device registry server to identify an appropriate request format for the intended device. An appropriately formatted request is transmitted to the gateway server responsible for communicating with the intended recipient device. The gateway server communicates the request to the device.

According to one aspect of the disclosed embodiments, the device communication environment, which may be referred to as a system or platform, is adapted to receive requests to register devices with the environment. In an example scenario, a request to register a device may be received from a manufacturer that is interested in having the device communicate with the communication environment. In an example scenario, the request may comprise information identifying the particular device such as, for example, a manufacturer's device serial number, a MAC address, or other suitable information that is associated with the device.

The request may further comprise information for use in authenticating the device when it subsequently attempts to access the device communication system. The information for use in authentication may comprise any data that is suitable for authenticating the device. For example, the request may comprise a digital certificate for use in authenticating the particular device. In an example scenario, the information may comprise, for example, a key that may be used in encryption and/or decryption of data. In an example scenario, the key may be the public key of a public-private key pair. A device security server receives the request in the environment, generates a unique device identifier, stores the information from the request with the device identifier, and responds with the unique device identifier. In an example embodiment, the device registration process may further involve generating a certificate which, in an example embodiment, may be stored in association with the device identifier. In an alternate embodiment, a certificate may be generated and communicated to the manufacturer, but not associated with a particular device identifier. When a device subsequently attempts to access the device communication environment, the device provides the generated unique device identifier and may provide data that has been encrypted using the private key that corresponds to the public key. The device security server authenticates the particular device by decrypting the data using the public key. In an embodiment, the request from the device may also comprise a certificate that the device security server may compare to the certificate that was earlier generated and may have been stored in association with the particular device.

According to another aspect of the disclosed embodiments, the device communication environment is adapted to receive requests to register entities, which may be, for example, individuals and/or organizations, as authorized to control or communicate with a particular device. In an example scenario, a request may be received from an entity (individual or organization) that may have purchased a device from a manufacturer that has previously registered the device with the environment. For example, the device may be a dishwasher, thermostat, or lighting assembly that an individual or organization purchased from the manufacturer. The entity may initiate a request, perhaps using a mobile phone application, to register the device as being associated with the entity. The request identifies the device using the unique identifier assigned during device registration and provides data identifying the particular entity that is requesting to be associated with the device. The request is received at the device security server and information associating the particular entity stored in relation to the device identifier. When the particular entity subsequently attempts to communicate data or commands to the particular device, the device security server uses the information received in the registration request to confirm that the particular entity is authorized to communicate with or control the particular device. Conversely, when an unregistered entity attempts to communicate with or control the device, the communication environment uses the information provided during registration to deny any such request.

Another recurring impediment to the creation of a device communication environment has been disparate technical characteristics of the numerous different devices that may attempt to connect to the environment. Of particular note are the numerous different commands or functions that various different devices may wish to perform. For example, a first set of devices may be programmed to expect data to be stored and retrieved in a first manner, while a second set of devices may be programmed to expect data to be stored and retrieved in a second manner. Moreover, the various electronic devices often use different communication protocols. For example, some electronic devices may communicate using HTTPs (Hyper Text Transport Protocol Secure), others may communicate using CoAP (Constrained Application Protocol), and still others may communicate using MQTT (Message Queue Telemetry Transport). The use of disparate protocols complicates the creation of a single network environment for use by all devices.

According to an aspect of the disclosed embodiments, the device communication system provides a gateway server for routing data and commands between electronic devices and a computing environment comprising computing resources. Upon receiving a request from an electronic device, a gateway server queries a distributed table in order to identify a particular gateway server that is responsible for processing requests from the particular device. The identified gateway server is programmed to convert requests formatted using functions or commands and protocols specific to the particular device into functions or commands and a format usable within a computing environment for providing computing resources.

In an example embodiment, a plurality of gateway servers are accessible via the Internet and available to provide access to computing services. Each gateway server is communicatively coupled with associated computing servers that operate to provide devices with access to a computing environment containing computing resources and to provide computing resources in the environment with access to connected devices.

In an example embodiment, each gateway is communicatively coupled with a distributed hash server. The distributed hash server may comprise a table of hash values corresponding to unique identifiers of the devices that connect to the computing environment. In an example embodiment, the hash table forms a consistent hash ring with each of the plurality of gateway servers having a hash value on the ring. The distributed hash server may be queried to locate the hash value for a particular device and a hash value corresponding to a gateway server that may be used for communication between the particular device and the computing environment.

In an example embodiment, each gateway server may be communicatively coupled with a device security server comprising information for authenticating that each particular device is authorized to communicate with the device communication system. Upon receipt of requests from devices, a gateway server may communicate with the device security server and with the device to confirm that the device is registered with the system and not otherwise excluded from communicating with the system.

In an example embodiment, each gateway server is also communicatively coupled with a device registry server. The device registry server is programmed with rules or logic for converting specialized device functions or commands received from devices in particular communication protocols such as, for example HTTPS, MQTT, CoAP, into functions or commands and protocols that are understood by other of the servers in the computing environment that provide the requested services. For example, the device registry server may be programmed with rules or logic for converting a request to store a file from a particular device into a storage function offered by a web services server. The device registry server is similarly programmed to receive requests from servers within the computing environment that provide services and to convert those requests into commands and protocols understood by connecting devices. For example, the device registry server may be programmed to receive a request to change the operating status of a particular device and convert that request into a function and format that is executable by the particular device to change operating status.

Each gateway server may further be communicatively coupled with a device shadowing server. The device shadowing server comprises data specifying one or more states for each device that is connected to the computing environment. In an example scenario, the device shadowing server may request that the gateway server communicate a status change to a connected device.

Each gateway server may be communicatively coupled with one or more "cloud services" or "web services" servers. Cloud/web services servers are programmed to provide functions or services to devices that access the computing environment. For example, web services servers may provide data storage and retrieval services and/or provide access to particular processing functionality. Web services servers may be those used to provide any suitable cloud-based or Web-based services.

Each gateway server may still further be communicatively coupled with a dispatcher server. The dispatcher server is programmed to provide an interface between the gateway server and the other servers in the computing environment. A gateway server forwards to the dispatcher server one or more requests to execute functions that correspond to the request received from the device. The dispatcher server communicates the requests to execute functions to the appropriate web server servers and communicates responsive information to the gateway server which may forward the responsive information to the requesting device.

According to an aspect of the disclosed embodiments, the gateway server processes requests from electronic devices for access to computing resources provided by the computing environment. In an example scenario, a request is received from a device at one of a plurality of gateway servers. The request may have been forwarded by a load balancing server that may have information provisioned therein identifying a particular gateway server to which requests from the particular device should be forwarded. It will be appreciated that the request may be received in any of several different communication protocols including, for example HTTPS, CoAP, and MQTT and further that the request may specify a function or capability that is particular to requests from the particular device or device type.

Upon receipt of requests from devices, the gateway server that was identified by the load balancer server and at which the request was received may communicate with the device security server and with the device to confirm that the device is registered with the system and not otherwise excluded from communicating with the system. In an example embodiment, the gateway server may forward to the device security server a device identifier received with the request along with any information that may be used to authenticate the device. The device security server may perform a handshake with the device via the gateway server in order to confirm that the device is, in fact, registered and eligible to communicate with the communication system.

Assuming the device is registered and authorized to communicate with the device communication system, the gateway server communicates the request that was received from the device to the device registry server. The device registry server queries its rules and logic in order to identify processing functions or commands executable by resources in the computing environment that correspond to the particular functions or commands received from the particular device. In other words, the device registry server converts the function or command received from the device into functions or commands that may be implemented in the computing environment. The device registry server returns information identifying the corresponding functions or commands to the identified gateway server.

The identified gateway server communicates the identified processing functions or commands to the dispatcher server. The dispatcher server communicates requests to perform the identified functions or commands to the relevant resources in the computing environment. In an example scenario, the dispatcher server communicates the commands to one or more web services servers that provide data storage, retrieval, and processing features. The dispatcher server communicates any results from the processing to the identified gateway sever which communicates a response to the requesting device.

According to another aspect of the disclosed embodiments, the disclosed device communication environment is adapted to receive requests or messages from the computing environment and transmit corresponding requests or messages to the appropriate device. In an example embodiment, the environment is adapted to determine whether the requests directed to a particular device are authorized. For example, when a request is received from a web services system or a system outside of the environment, the request may be routed to the device security server which evaluates the request in order to determine if the request is authorized. In an example scenario, the device security server evaluates the request in order to determine whether the request is from an entity (individual or organization) authorized to perform the requested control of the device. For example, the device security server compares information received with the device indicating who the generated the request with information identifying entities that previously registered as being authorized to control the particular device. In the scenario where the information received with a request indicates the request is from an entity authorized to communicate with or control the device, the device security server forwards the request for further processing. In an example scenario, the request may be forwarded to a device shadow server, if the request requires processing at the device shadow server, or to a gateway server.

In an example scenario, the request or message is received at a gateway server from a computing system in the computing environment. For example, a request to change the operating status of a device may be received from a device shadowing server. The request may specify the particular device by specifying a particular connection.

The gateway server at which the request is received identifies one of the plurality of gateway servers as responsible for processing requests to the particular device. In an example embodiment, the gateway server at which the request is received queries the distributed hash server to identify one of the plurality of gateway servers as corresponding to the particular connection or device to which the request is directed. In an example embodiment, the distributed hash server queries a consistent hash ring to identify the one of the plurality of gateway severs responsible for the particular device.

The identified gateway server formats a request or message formatted for communication to and processing by the target device. In an example embodiment, the identified gateway server may request that the device registry server query its rules database to identify a command or function suitable for the processing by the device but corresponding to that received by the identified gateway server. Once the identified gateway server identifies the function or command corresponding to that of the received request, the identified gateway communicates the function or command formatted for processing by the target device.

While the above discussion provides detail regarding some example device gateway features of the described techniques, it is noted that the described techniques also provide a number of device state management features that may improve upon existing technologies. In particular, one drawback of existing technologies is that connected devices may have various associated operational and functional limitations that may negatively impact the ability of cloud or other distributed computing applications to interact with the devices. For example, in order to conserve power, many battery-powered and other devices may disable wireless radios when not actively transmitting data or polling for updates. For these and other reasons, many devices may connect to external components only intermittently, while applications may attempt to interact with the devices at any time. Furthermore, as devices and their corresponding functionality become increasingly more complex, the production and operating costs for the devices may continue to increase.

In order to alleviate these and other concerns, the described techniques may employ a device shadowing service that may generate and maintain a cached representation of each connected device. Devices may report state changes and other information to the service, and this reported information may be stored within the device representation. The cached information may then be made available to applications at any time by the device shadowing service without the need to wake up or otherwise contact a device itself. Thus, the caching of information by the shadowing service may reduce the frequency and quantity of communications between the devices and external components, thereby reducing device operating costs, such as power consumption costs and network communications costs.

In some cases, when devices report state changes, the state changes may trigger various operations to be performed by the service. For example, the service may process reported information to identify errors, calculate mean, maximum, and minimum values, and other operations. As another example, the service may identify safety concerns and other problematic conditions, such as multiple readings that fall outside of a desired range. In some cases, the ability of the service to perform additional processing operations may reduce the amount of processing required by the connected devices, thereby reducing cost and complexity of the devices. In some examples, additional operations may be performed using cloud or other distributed computing functions that are triggered in response to events. The use of such event-triggered computing functions may further reduce costs by consuming computing resources only at times when they are invoked.

The device shadowing service may also, for example, process requests from applications to change device state and otherwise control or manipulate the connected devices. For example, the device shadowing service may include logic to determine when a desired device state differs from an actual device state and to issue a command to the device to change state based on such a determination. Additionally, the device shadowing service may allow virtual device commands to be defined and exposed to applications. These virtual commands may be formulated based on one or more existing device commands that are understood by the device. For example, a virtual "blink" command for a light could include combinations of existing "on" and "off" commands called in succession to generate a blinking effect. When a virtual command is issued by an application, the command may be processed by the service, by, for example, invoking an associated event-triggered computing function.

Example Computing Environment

FIG. 1 is a diagram illustrating an example computing environment 110 with which devices may communicate. Computing environment 110, which may be referred to as a device communication environment or system, comprises various resources that are made accessible via gateway 140 to devices 130 that access the gateway via network 120. Devices 130 may access computing environment 110 in order to access services such as data storage and computing processing features. Services operating in environment 110 communicate data and messages to devices 130 in response to requests from devices and/or in response to computing operations within the services.

Computing environment 110 comprises communicatively coupled component systems 140, 142, 144, 146, and 150 that operate to provide services to devices 130. Gateway server 140 is programmed to provide an interface between devices 130 and computing environment 110. Gateway server 140 receives requests from devices 130 and forwards corresponding data and messages to the appropriate systems within environment 110. Likewise, when systems within environment 110 attempt to communicate data instructions to devices 130, gateway server 140 routes those requests to the correct device.

Gateway server 140 is adapted to communicate with varied devices 130 using various different computing and communication capabilities. For example, gateway server 140 may be adapted to communicate using either TCP (Transmission Control Protocol) or UDP (User Datagram Protocol) protocols. Likewise, gateway server 140 may be programmed to receive and communicate with devices 130 using any suitable protocol including, for example, MQTT, CoAP, HTTP, and HTTPS. Gateway server 140 is programmed to convert the data and instructions or messages received from electronic devices into a format that may be used by other of the server systems comprised in computing environment 110. In an example scenario, gateway server 140 may be adapted to convert a message received using the HTTPS protocol into a JSON (JavaScript Object Notation) formatted message that is suitable for communication to other servers within environment 110.

Gateway server 140 may itself store, or may control the storing, of information regarding the devices 130 that have formed connection to the particular gateway server and for which the particular gateway server is generally relied upon for communications with the device. In an example embodiment, gateway server 140 may have stored thereon information specifying the particular device such as a device identifier, i.e., device_id. For each connection established from the particular device, the gateway server 140 may also maintain information identifying the connection. For example, a connection identifier, i.e., connection_id, may be generated and stored for each connection established with a particular device. Information relating the particular connection may also be stored. For example, information identifying the particular socket of the gateway server 140 on which the connection was established, as well as information identifying the particular protocol used by the device on the connection may be stored by gateway server 140. Information such as the socket and protocol may be used in order to facilitate further communications via the particular connection.

In an example embodiment, gateway server 140 is communicatively via any suitable networking technology with device registry server 142. Device registry server 142 is adapted to track the attributes and capabilities of each device 130. In an example embodiment, device registry sever 142 is provisioned with information specifying the attributes of devices 130. In an example scenario device registry server 142 comprises data specifying rules or logic for handling the various requests that may be received from devices 130. Device registry server 130 may be programmed to convert specialized device functions or commands received in particular communication protocols such as, for example HTTPS, MQTT, CoAP, into functions or commands using particular protocols that are understood by other of the servers in the computing environment 110. In an example scenario, device registry server 142 may be provisioned with information specifying that upon receipt of a particular request from a particular device 130, a request should be made to store the payload data of the request in a particular network service server 150. Device registry server 142 is similarly programmed to receive requests from servers 142, 150 and convert those requests into commands and protocols understood by devices 130. In an example scenario, device registry server 142 may be provisioned with information specifying that upon receipt of a particular function or command from server 142 for a particular device or connection, device registry identifies a corresponding function or command for the particular device 130

Device shadowing server 144 maintains state information for each connected device 130. In an example embodiment, device shadowing server 144 maintains for each device 130 that has connected to the environment 110 information specifying a plurality of states. In an example scenario, device shadowing server 144 may comprise an actual state and a desired state. The actual state represents the existing state of the particular device 130 as presently known to server 144. In an example scenario, for example, device shadowing server 144 may identify that the actual state of a light switch device is "on." The desired state represents a state to which it is desired to change the status. In an example scenario, device shadowing server 144 may identify the desired state of a light switch device is "off." Network services server 150 may communicate with device shadowing server 144 in order to change the desired state information. Device shadowing server 144 communicates with device gateway 140 in order to communicate requests to update a status to a particular device 130. For example, device shadowing sever 144 may communicate to device gateway 140 that a particular switch device should have its state changed to "off." Device gateway 140 may, in response, communicate that appropriate command formatted for the particular device.

Device security server 146 maintains security-related information for devices 130 that connect to environment 110. In an example embodiment, device security server 146 is programmed to process requests to register devices with environment 110. For example, entities such as, for example, device manufacturers, may forward requests to register devices with environment 110. Device security server 146 receives registration requests and assigns unique device identifiers to devices which use the device identifiers on subsequent requests to access environment 110. Device security server 146 stores, for each registered device, authentication information that is provided during the device registration process. For example, a request to register a device may comprise information identifying the device such as a device serial number and information for use in authenticating a device. In an example scenario, the information may comprise a digital certificate and may comprise a public key of a public key-private key pair. The information is stored in relation to the assigned device identifier for the particular device. When the device subsequently attempts to access environment 110, the request may be routed to device security server 146 for evaluation. Device security server 146 determines whether authentication information provided in the request is consistent with the authentication information stored in relation to the device identifier and provided during the registration process.

Device security server 146 may be further programmed to process request to associate particular entities (individuals or organizations) with particular devices. The device security server 146 is adapted to receive requests to register entities, which may be, for example, individuals, users, accounts, and/or organizations, as authorized to control or communicate with a particular device. In an example scenario, a request may be received from an individual or organization that may have purchased a device from a manufacturer. For example, the device may be a dishwasher, thermostat, or lighting assembly that an individual or organization purchased from the manufacturer. The individual or organization may initiate a request, perhaps using a mobile phone application, to register the device with the individual or an organization with which the organization is associated. The request may be routed to a web services server which may be comprised in environment 110 or which communicates the request to the environment 110. The request identifies the device and the particular entity (individual or organization) that is requesting to be associated with the device. In an example embodiment, the request may comprise the unique device identifier that was assigned when the device was registered with the system. The request further may comprise information uniquely identifying the entity that is registering as having authority to communicate with and/or control the particular device.

Device security server 146 stores the information identifying the particular entity in relation with the device identifier. When the particular entity subsequently attempts to control or communicate data to the particular device, the device security server 146 may use the information to confirm that the particular entity is authorized to communicate with or control the particular device. When an entity that has not been registered as being authorized to communicate with the device attempts to communicate with or control the device, device security server 146 may use the information stored in the device security server to deny the request.

Network services server 150 may be any resource or processing server that may be used by any of servers 140, 142, 144, 146, 148 in processing requests from devices 130. In an example scenario, network services server 150 may provide data storage and retrieval services and/or on-demand processing capacity. In an example scenario, network services server 150 may be any of numerous network accessible services including, for example, web or cloud-based services such as, for example, Amazon Lambda, Amazon DynamoDB, and/or Amazon Kinesis. In an example embodiment, web services server 150 may be specially programmed to provide particular processing for particular devices 130 and/or groups of devices 130. For example, a network services server 150 may be provisioned with software that coordinates the operation of a particular set of devices 130 that control a particular manufacturing operation.

Servers 140, 142, 144, 146 and 150 are communicatively coupled via any suitable networking hardware and software. For example, the servers may communicate via a local area or wide area network.

External system 160 may access environment 110 for any number of purposes. In an example scenario, external system 160 may be a system adapted to forward requests to register devices with environment 110. For example, external system 160 may be a server operated by or for a device manufacturer that sends requests to environment 110, and device security server 146 in particular, to register devices 130 for operation with environment 110. Similarly, external system 160 may be a system operated to provide a gateway for entities (individuals or organizations) to register an ownership or control relationship with a particular device 130. For example, external system 160 may be a system operated by or for a device manufacturer that individuals or organizations who purchased devices from the manufacturer may access to register ownership of a purchased device.

Devices 130 may be any devices that may be communicatively coupled via a network 120 with computing environment 110. For example, devices 130 may be computing devices such as smart phones and tablet computers, automobiles, appliances such as washers and driers, industrial sensors, switches, control systems, etc. In an example scenario, each of devices 130 may communicate over network 120 to store data reflecting the operations of the particular device and/or to request processing provided by, for example, network services server 150. While FIG. 1 depicts three devices 130, it will be appreciated that any number of devices 130 may access environment 110 via gateway server 110. Further it will be appreciated that the devices may employ various different communication protocols. For example, some devices 130 may transport data using TCP, while others may communicate data using UDP. Some devices 130 may use MQTT, while others may use CoAP, and still others may use HTTPs. It will also be appreciated that each of devices 130 may be programmed to send and receive particular functions or commands in its requests that are not compatible with other devices or even the systems within computing environment 110. Gateway server 140 is programmed to receive and, if needed, attend to converting such requests for processing with computing environment 110.

Communications network 120 may be any type of network that is suitable for providing communications between devices 130 and computing environment 110. Moreover, communications network 120 may comprise a combination of discrete networks which may use different technologies. For example, communications network 120 may comprise local area networks (LANs), wide area networks (WAN's), cellular networks, or combinations thereof. Communications network 120 may comprise wireless, wireline, or combination thereof. In an exemplary embodiment, communications network 120 comprises the Internet and may additionally comprise any networks adapted to communicate with the Internet. Still further, the communications network 120 may make use of any suitable protocols such as, for example, Web protocols that employ HTTP.

Figure 2:
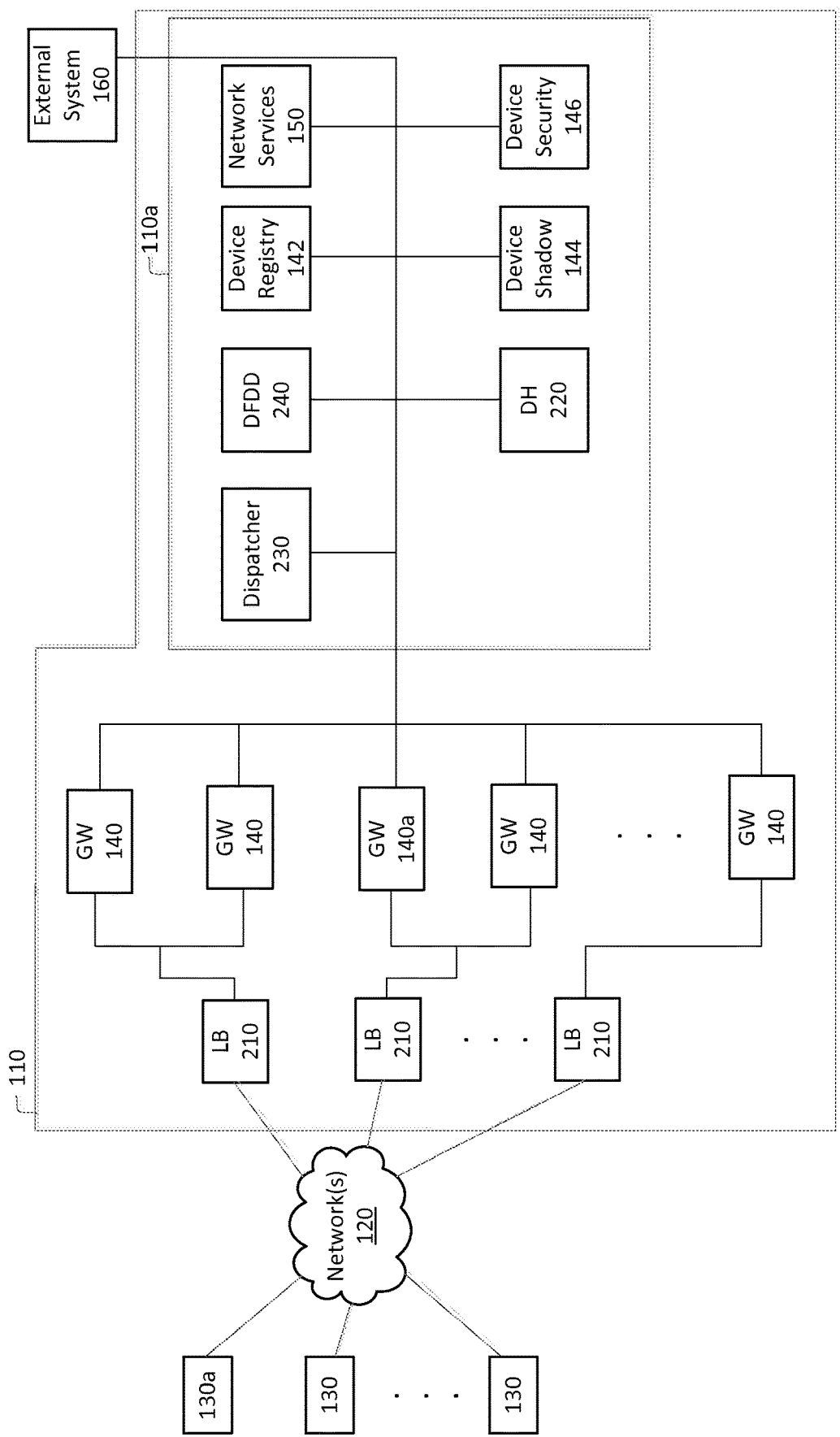
FIG. 2 depicts an example computer networking architecture for providing device access to network services.

It will be appreciated that there may be any number of devices 130 that access computing environment 110. Indeed, billions of electronic devices exist that may benefit from interfacing with computing environment 110. Moreover, these same devices will be geographically distributed. FIG. 2 illustrates an example architecture of a computing environment 110 suitable for handling processing associated with large numbers of devices 130 which may be geographically distributed. As shown, a plurality of devices 130, which may number in the thousands, millions, or even billions, are communicatively coupled to network 120. In the disclosed embodiment, computing environment 110 comprises a plurality of load balancers 210 which operate to route requests from devices 130 to a plurality of gateway servers 110. Generally, load balancers 210 operate to distribute the processing load in a desired fashion amongst the available gateway servers 140. Any suitable load balancer may employed including, for example, that described in U.S. patent application Ser. No. 13/864,167 titled "Distributed Load Balancer," the contents of which are hereby incorporated herein by reference in its entirety. In an example embodiment, each request from devices 130 is routed by one or more domain name services (DNS) hosting services in network 120 to a particular load balancer 210, the internet protocol (IP) addresses of which are registered with the DNS services.

Each load balancer 210 is communicatively coupled with one or more gateway servers 140. Upon receipt of a request from a device, the load balancer 210 at which the request is received routes the request to a gateway server 210 that has been identified as responsible for processing requests from the particular device 130 from which the request was received. The load balancer 210 at which the request was received may have been provisioned with information indicating that requests from particular devices should be routed to particular gateway servers 210.

Referring to FIG. 2, each of gateway servers 140 has access via, for example one or more networks, to an arrangement of computing devices such as is illustrated by the environment designated 110a. For purposes of clarity, the details of computing arrangement 110a are illustrated in connection with gateway server 140a, although similar features apply to the other gateway servers as well. Gateway server 140a is communicatively coupled with device registry server 142, device shadow server 144, device security server 146, and network services server 150 which operate consistent with the description above in connection with FIG. 1. Gateway server 140a is further communicatively coupled with distributed hash server 220, discovery failure detection daemon 240, and dispatcher server 230.

Distributed hash server 220 comprises information that allows gateway servers 140 to identify the particular gateway server that is responsible for communication with a particular device and, in some instances, the particular gateway server that is responsible for communicating with a particular device on a particular connection. Any suitable manner of storing information to allow gateway servers to derive the appropriate gateway server may be used. In an example embodiment, hash values for devices, connections, and device gateways are generated and stored in relation to each other for later querying in order to identify the particular device gateway that corresponds to a particular device or connection.

In an example embodiment, a hash value for each device that has previously communicated with a gateway in server environment 110 may be comprised in distributed hash server 220. In an example embodiment, the hash values stored in server 220 have been generated by performing a hashing function on a unique identifier corresponding to each of devices 130. The unique identifier used in generating the hash value may be any that is suitable for identifying individual devices. For example, the unique identifier may be a device identifier, i.e., device_id, that corresponds to a particular device and which may have been generated by device security server 146 during a registration process. The unique identifier may be one that is associated with the physical hardware of the device such as, for example, a universally unique identifier (UUID), a machine access control address (MAC address), an IP address, etc. In an embodiment, unique identifiers may be assigned to devices when they first initiate communication with environment 110. For example, the system and, in particular, device security server 146 may generate a unique identifier for the particular device. The unique identifier may be, for example, an identifier formatted consistent with Internet Protocol version 6. A hashing function, which may be any that is suitable, is performed on the unique identifier and the result stored in distributed hash server 220.

In an example embodiment, distributed hash server 220 comprises information specifying the particular gateway server 140 that corresponds to each device 130. In an example embodiment, the hash data is implemented as a consistent hash ring wherein identifiers of gateway servers 140 are included in the hash ring in addition to hashes of the device identifiers. Hash functions of identifiers associated with the gateway servers 140 are computed and the resulting hash values stored in a manner such that the hash value of a gateway server corresponding to a particular device may be located and the particular gateway server identified. For example, the hash values corresponding to gateway servers may be placed on the ring such that once a hash value for a particular device is located, locating the hash value of the corresponding gateway server is performed by moving in a particular direction, e.g., clockwise, on the ring until reaching the first gateway hash value. The first gateway server hash located upon moving in a clockwise direction corresponds to the gateway server responsible for responding to the request.

According to another aspect of an example embodiment, the distributed hash server 220 may further comprise hash values for information identifying particular connections with devices. A connection identifier may be generated by the gateway server 140 or another component server when devices access the system. Each gateway server may maintain the connection identifier information for the connection established through that server. However, the distributed hash server 220 may also be provisioned with hash values for the connection identifier information so that all gateway servers may identify the particular gateway server responsible for the connection. Accordingly, a hash value for each connection identifier may be stored in relation to the hash value of the device and the hash value of the gateway server to which the connection identifier corresponds. The hash value of the connection information may be stored in a consistent hash ring as noted above, and may be used to retrieve the corresponding device identifier and/or gateway identifier in a manner similar to that described above.

Discovery failure detection daemon 240 comprises a database of gateway devices 140 that are currently active and available for communicating with devices. Discovery failure detection daemon 240 may be queried by servers such as device shadow server 144 and/or network services server 150 prior to attempting to contact a gateway server 140 for purposes of communicating a message to a device via a gateway server. Performing such a query allows servers to identify which servers are/are not available.

Dispatcher server 230 is programmed to act as an interface between gateway server 140a and the other servers such as device shadow server 144 and network services server 150 in the computing environment 110a. Gateway server 140a forwards one or more requests to perform functions or commands that correspond to functions or commands in a request received from device 130a to dispatcher server 230. Dispatcher server 230 communicates a request to perform the identified functions or commands to the appropriate network services servers 150 and communicates responsive information to gateway server 140a, which may forward the responsive information to device 130a.

It will be appreciated that the various computing systems, including servers, that are described herein, may be implemented in any suitable manner. For example, the computing systems may be implemented as virtual servers or virtual instances that exist on one or more physical servers as described below in connection with FIGS. 18 and 19. It will be further appreciated that the various servers described in connection with FIGS. 1 and 2 may be arranged and distributed across physical and virtual servers in any suitable manner. In an example embodiment, the servers may be comprised in a single instance of a physical or virtual server. For example, Gateway server 140, dispatcher 230, device registry 142, device shadow server 144, device security server 146, and network services server 150 may be comprised on or hosted on a single physical or virtual server instance. In other embodiments, each of servers gateway server 140, dispatcher 230, device registry 142, device shadow server 144, device security server 146, and network services server 150 may execute on separate physical or virtual server instances. The computing devices/servers and the functionality described herein may be distributed in any manner among server instances and remain within the scope of intended embodiments.

Figure 3:
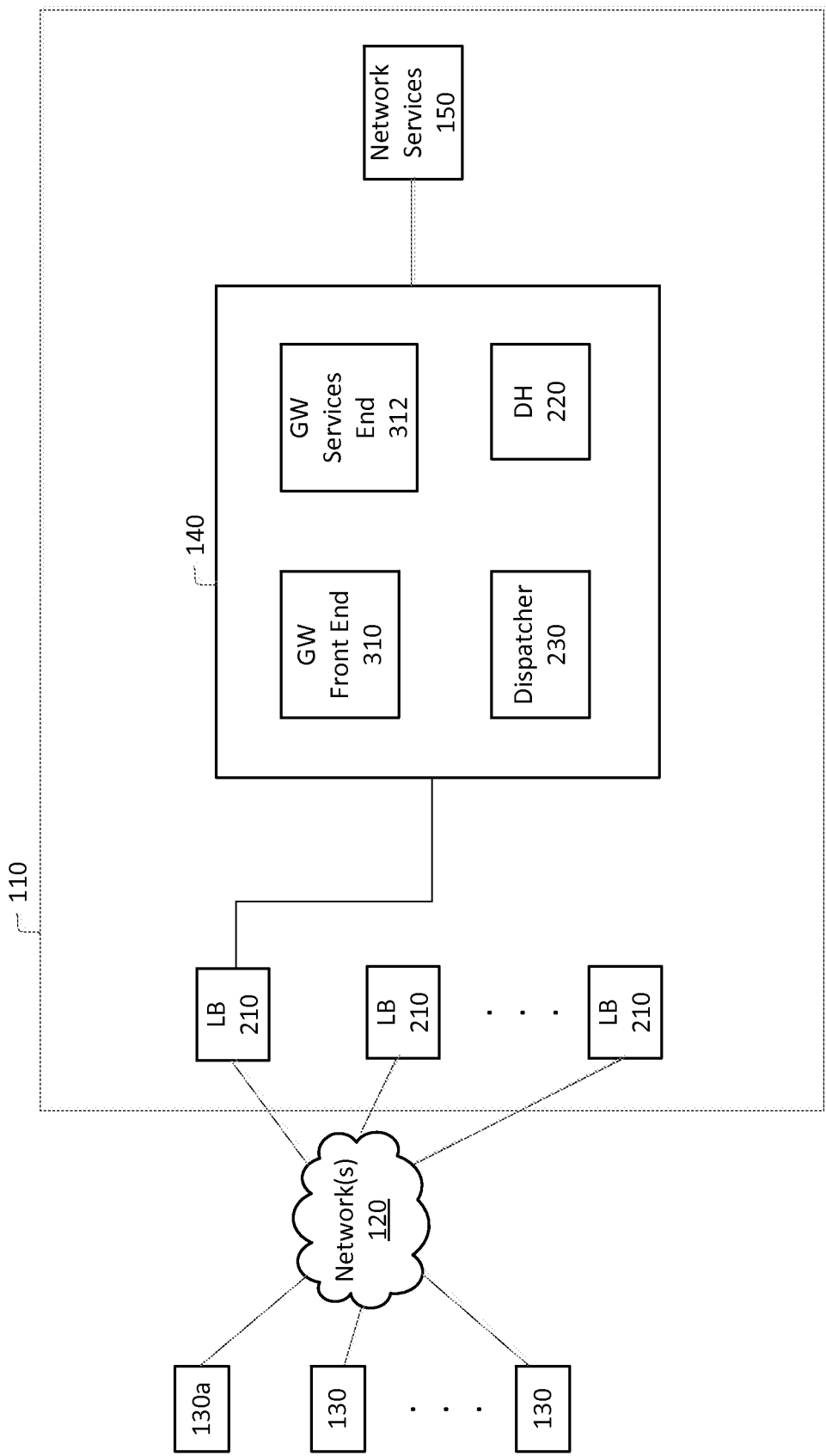
FIG. 3 depicts an example computer networking architecture for providing device access to network services.

FIG. 3 depicts component portions of an example embodiment of gateway server 140. As shown, in an example embodiment, gateway server 140 may comprise gateway front end 310 and gateway web service end 320. Gateway front end 310 generally corresponds to that portion of the gateway server's functionality in interfacing with devices 130. For example, gateway front end 310 both receives and processes requests from devices and communicates requests to devices 130. Gateway web service interface 320 corresponds to that portion of gateway server's functionality used in interfacing with services within the computing environment 110. For example, where a network services server 150 has data or a request for transmission to a particular device 130, the data and request may be received by gateway web service 320.

As illustrated in FIG. 3, in an example embodiment, dispatcher server 230 may be configured as a portion of gateway server 140. Likewise, distributed hash server 220 may be configured as a portion of gateway sever 140.

Figure 4:
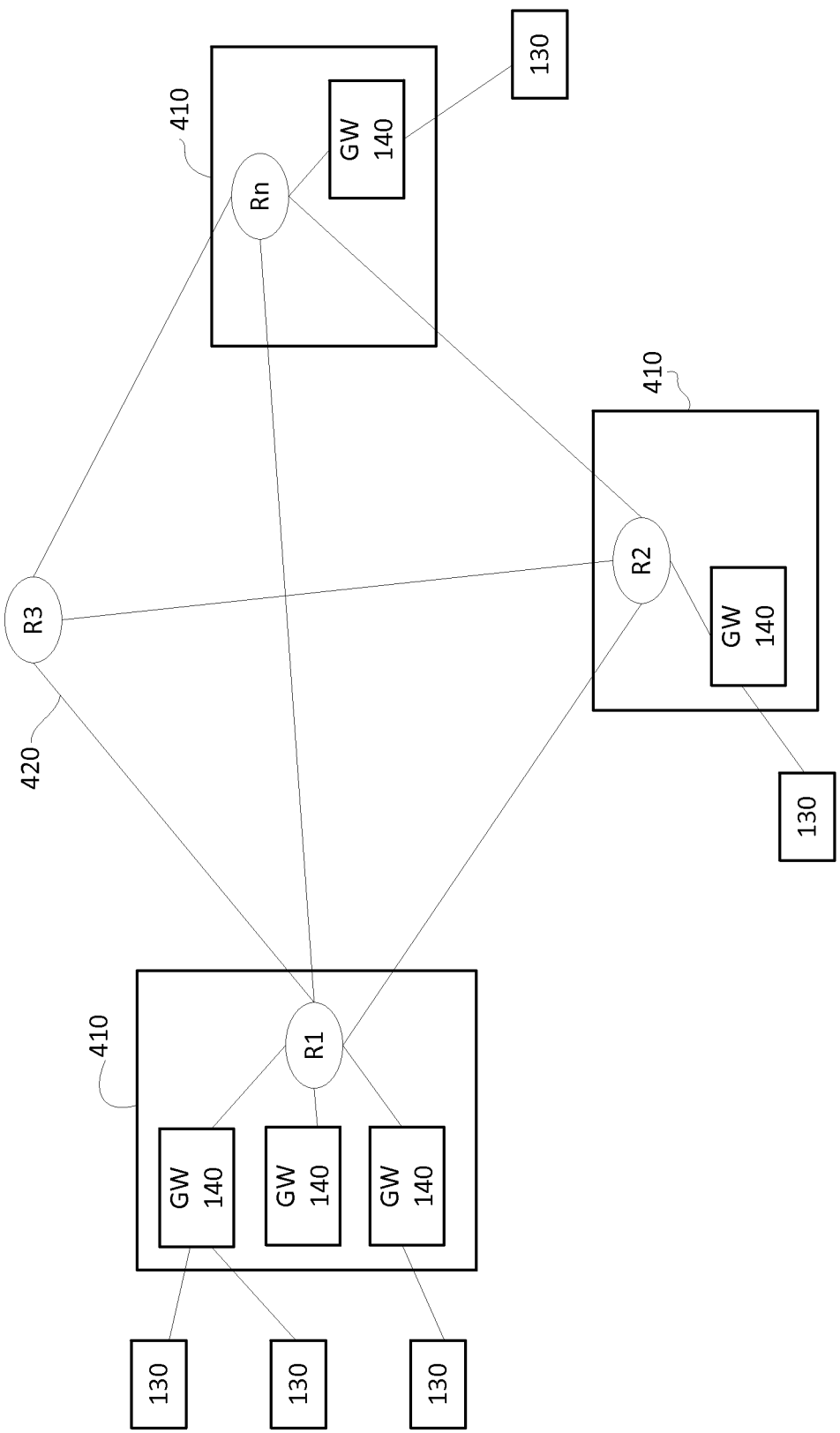
FIG. 4 depicts an example computer networking architecture for providing device access to network services.

It will be appreciated that computing environment 110 depicted in FIGS. 1 and 2, may be arranged in numerous different configurations. FIG. 4 depicts another example configuration. In the particular configuration of FIG. 4, gateway servers 140 located in geographically distant regions 410 are communicatively coupled via overlay network 420 which may employ, for example, a backbone networking technology such as border gateway protocol (BGP) for coordination between servers 140. In such an embodiment, each cluster of gateway servers 140 may form an autonomous system with an assigned subnet with an associated IPv6 number. In an example embodiment, each device 130 that connects to a node in a particular region 410 may be assigned a unique identifier such as, for example, an IPv6 address that corresponds to the particular subnet associated with the particular region 410. In such an embodiment, when a device with an IPv6 formatted number makes a request, identifying the corresponding region and gateway is a relatively straightforward routing exercise.

Example Request Processing

In an example embodiment, devices 130 must be registered with environment 110 in order to communicate with environment 110. In an example embodiment, device communication environment 110 maintains a device identifier for each registered device 130. The device identifier, which may be referred to as a device_id, uniquely identifies a particular device 130 within environment 110 and may be used in determining whether to provide access to a particular device. In some embodiments, the process of registering devices with environment 110 may involve provisioning devices with certificates that may be used during subsequent communications with environment 110.

Figure 5:
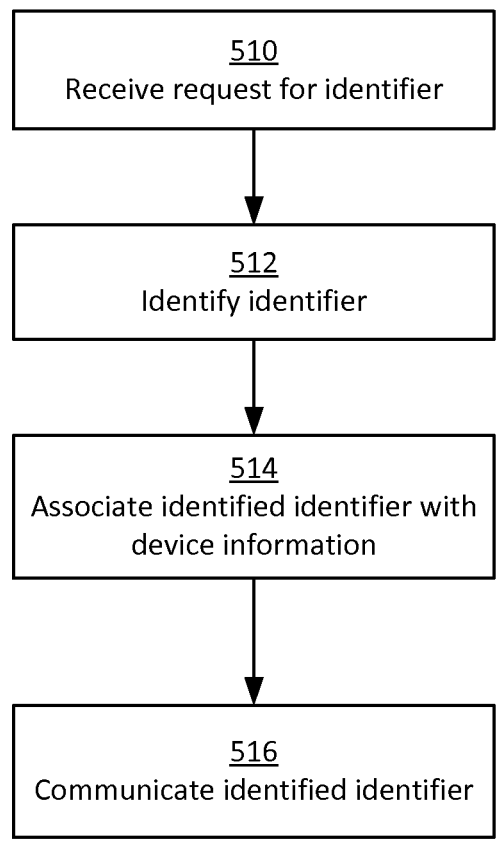
FIG. 5 depicts a flow diagram of an example process for registering devices.

The process of registering devices 130 with environment 110, including assigning device identifiers, may be performed using any suitable processing. FIG. 5 depicts a flow chart of an example process for registering a device 130 with device communication environment 110. At block 510, a request is received at device security server 146 to register a device with the environment 110. The request may be received from any system that is adapted to communicate a properly formatted request to device security server 146. In an example scenario, requests to assign device identifiers to particular devices may be received from, for example, a web services server 150, which itself may have received a request from external system 160 which may be maintained by, for example, a manufacturer of devices. In still another scenario, a request to assign a device identifier may be received from the device itself. The request may be received using an application programming interface (API) that the device security server 146 makes available for receiving registration requests.

The request to register a device 130 comprises information about the particular device which is subsequently associated with the device 130 in environment 110. In an example scenario where a device 130 is being registered by a manufacturer of the device, the request may comprise a serial number that the manufacturer has associated with the particular device. In an alternative scenario, the information about the device may be a unique identifier that is associated with the physical hardware of the device such as, for example, a universally unique identifier (UUID) or a machine access control address (MAC address). In an example embodiment, the request may further comprise information that may be used to authenticate the particular device 130 when the device 130 subsequently attempts to communicate with communication environment 110. In an example embodiment, the request may comprise a public key of a public key-private key pair. The public key may be used on subsequent attempts by the device 130 to communicate with environment 110. More particularly, subsequent attempts by the particular device 130 to access communication environment 110 may comprise data encrypted with the private key of the key pair. The communication platform 110 uses the public key to decrypt the received encrypted data and thereby authenticate the particular device 110. In an alternative embodiment, the public key may not be provided in the received request, but may be generated by device security server 146.

In an example scenario, a request to register a device may further comprise a certificate signing request (CSR), in response to which, device security server 146 generates and provides a public key certificate. The CSR may take any suitable form including, for example, a public key cryptography standard (PKCS) number 10. In an example embodiment, the request may be formatted as a call to a CreateCertificate API which may take as an argument the certificate signing request.

In some instances, it may be desired to assign an activation code to a device which may subsequently be used during activation of the device. In such an embodiment, the activation code may be identified during the process of device registration. For example, the manufacturer may communicate a device activation code as part of the device registration process so that environment 110 is aware of the code that is required to activate the particular device. In an example embodiment wherein the received request is a formatted as a CreateCertificate API request, the API call may further take as an argument an activation code that the organization that is making the request, e.g., the manufacturer, intends to be assigned to the particular device. For example, the request may appear as follows: CreateCertificate(certificateSigningRequest, [activationCode]). In an embodiment where activation codes are employed, but the device registration request does not include an activation code, device security server 146 may generate an activation code as part of the device registration process.

It will be appreciated that the request to register a device 130 may comprise a request to register a plurality of individual devices. For example, a request may have originated from an external system 160 operated by or for a device manufacturer and may specify a plurality of devices that were recently manufactured and which the manufacturer wishes to register. Device security server 146 is programmed to process requests identifying a plurality of devices using any of several suitable techniques including, for example, processing each request separately.

Referring to FIG. 5, at block 512, device security server 146 generates and/or allocates a particular device identifier for the particular device identified in the request. The format and content of the device identifier may be any that is suitable to uniquely identify the particular device. In an example embodiment, device security server 146 may generate a unique identifier consistent with the Internet Protocol version 6.

In addition, device security server 146 may generate a public key certificate that illustrates ownership of a public key. For example, device security server 146 may generate a public key certificate in response to receiving a certificate signing request as part of the device registration. In an example embodiment, the generated certificate may subsequently be used when the particular device attempts to communicate with environment 110 during a TLS certificate exchange.

In an embodiment wherein the registration processing involves assigning activations codes to devices, and the request to assign an activation code does not include a code, device security server 146 may generate the activation code. The generated activation code may have any suitable format.

At block 514, device security server 146 associates the generated device identifier with the related identifying information for the particular device. For example, device security server 146 may store the device identifier in association with the device identifying information (e.g., device serial number, MAC address, etc.) and any authentication information (e.g., a public key or digital certificate) that was provided in the request. Likewise, device security server 146 may associate any public key certificate that may have been generated with the device identifier. Still further, device security server 146 may associate the generated device identifier with any activation code that was provided by the manufacturer or which may have been created by device security server 146. Device security server 146 may form the association by storing the device identifier in relation to the device identifying information and device authentication information in a data store such as a database.

At block 516, device security server 146 generates and communicates one or more responses to the registration related requests that have been received. In an example embodiment, the responses identify the device identifier that has been associated with the device 130 that was specified in the request. The response may further specify the device authentication information, which may have been included in the original request from the device. In embodiments wherein a certificate signing request was made, responsive information including a generated certificate is communicated by the device security server 146. The certificate may subsequently be used when the device connects to environment 110 so that the device can verify that it is connected to the correct service. In an example embodiment, the device may use the certificate to perform a TLS exchange with environment 110 to verify that it is communicating with the intended service. Further, in embodiments wherein device activation codes are associated with devices and used during subsequent processing, responsive information provided by device security server 146 may comprise a device activation code.

In some embodiments, the response from device security server 146 may further provide environment authentication information that the device 130 may use to authenticate that it is connecting to the communication environment 110, as opposed to another system. The additional information provided in the response may comprise, for example, a public key that corresponds to a private key that is maintained in secrecy by the device security server 146. When the device 130 subsequently attempts to access the environment 110, the device 130 may use the public key to decrypt data that is sent by the device communication system 110 so as to authenticate that the device has connected to the intended system.

In embodiments wherein a certificate was requested and received from device security server 146, the manufacturer, or other provider of the device, may store the credentials on the corresponding device. For example, the manufacturer may store on the device the device identifier assigned by communication system 110, the public key of the private key-public key pair associated with the device, and any certificate created in response to a certificate signing request. In an example embodiment, the provider of the device may use an ImageDevice API call to the device in order to store the information on the device.

In some instances, it may be desirable to associate particular entities, which may be, for example, individuals, users, accounts, organizations, etc., with particular devices and to use this information in connection with processing requests to control or communicate with the particular device. As discussed in connection with FIG. 5, a manufacturer of devices may register the devices with the device communication system 110. The manufacturer may subsequently sell those registered devices to the public. For example, the manufacturer of devices such as thermostats, washer machines, or any other device, may register the devices, as described above, and then may sell those devices to the public. The purchasers of those devices may then wish to register that they had purchased or control particular ones of the devices. In an example embodiment, the device communication environment 110 may receive and store information specifying the particular entity (e.g., individual or organization) that is associated with the particular device. This association between the device and the particular entity (e.g., individual or organization) may subsequently be used to regulate requests to control or communicate with the particular device. In connection with associating themselves with a particular device, an entity may also activate the device with the environment 110. Where an activation code was associated with a particular device during the manufacturer's registration process, the purchaser may use the activation code to activate the device.

Figure 6:
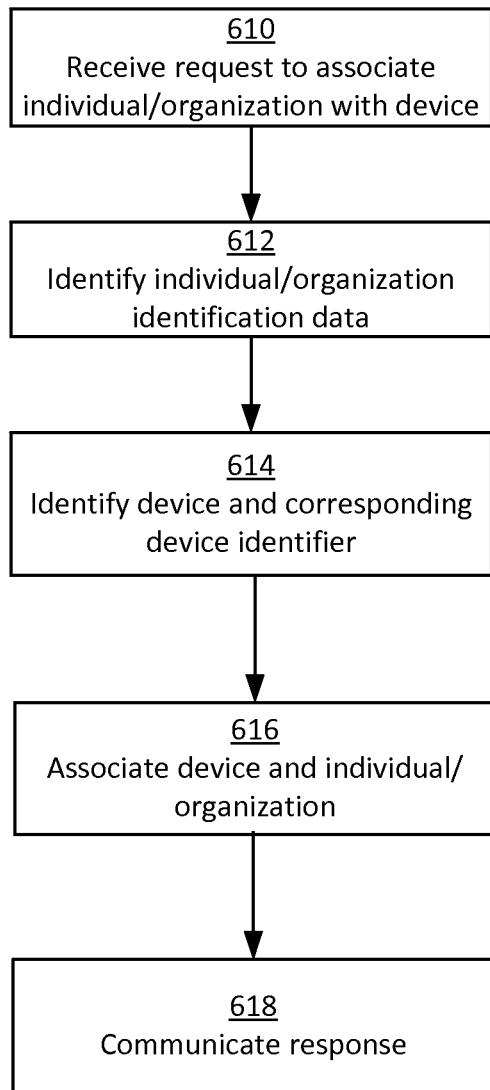
FIG. 6 depicts a flow diagram of an example process for associating entities with devices.

FIG. 6 depicts a flow chart of an example process for associating a device with a particular user, operator, or organization. As shown, at block 610, device security server 146 receives a request to associate information identifying a particular entity (e.g., individual or organization) with a particular device. The request may be received via an API provided by device security server 146 and may have originated from any suitable system. In an example scenario, the request may additionally comprise a request to activate a device using an activation code that was specified during a manufacturer device registration. In an example embodiment, a separate request to activate the device may be received. In an example scenario, the request may be received from an external service 160 operated by or for the manufacturer of the device that receives requests from the purchasers of the devices and formats appropriate requests to associate the purchaser with the purchased device. In an example scenario, the third party service 160 may receive requests originating from the purchasers of the device who may input the device identifier assigned to the device via any of numerous different means. In an example scenario, the individual may use a mobile device application that may be provided by or for the manufacturer of the device to retrieve the device identifier, and possibly a device activation code, from the device that was purchased. The app may use any suitable technology to retrieve a device identifier from the device. For example, the app may provide for scanning a bar code or QRC code that was provided with the particular device and which contains the device identifier. In another embodiment, the mobile application may use near field communication (NFC) to retrieve the device identifier from a corresponding transmitter on the purchased device. In yet another embodiment, the purchased device may operate as a beacon and operate as an access point with which the mobile application pairs to retrieve the device identifier. In still another embodiment, the mobile app may be adapted to receive the device identifier via manual input (e.g., typing).

The particular entity (e.g., individual or organization) is identified in the request received at device security server 146 using any suitable identifying information. In an example embodiment, the information identifying an entity (e.g., individual/organization) may be information identifying a particular account with which the particular entity is associated. For example, information may comprise information identifying an account with an existing service such as, for example, the Amazon Cognito service. In an example scenario, the entity that purchased the device may enter their account information for such a service. In an another scenario, the entity may log into the existing services such as Amazon Cognito in order that their identification information may be retrieved and included in the request. In an example scenario, the system or service that generates and forwards the request to device security server 146 may have previously retrieved the identifying information from the existing service.

In an alternate embodiment, rather than originating at an external service 160, the request to pair a device with a particular entity (e.g., individual or organization) may be received directly from a mobile application operating on an individual's mobile device without the use of an intervening service or system. In still another embodiment, the device itself may have an interface that allows for collecting entity identifying information such that the device may communicate the device identifier and entity identifying information to device security server 146 without use of a mobile application or even a service operated by or for the manufacturer.

Referring to FIG. 6, at block 612, device security server 146 parses the received request and identifies the information identifying the particular entity (e.g., individual/organization). The information identifying the entity uniquely identifies the particular entity and may have any suitable format.

At block 614, device security server 146 parses the received request and identifies the device and the corresponding device identifier. The processing may involve authenticating that the request is legitimate for the particular device identified in the request. For example, the request may contain additional information that has been signed using a private key of the public-private key pair that was associated with the particular device during the device registration process. Device security server 146 may decrypt the received data with the public key and, depending upon the value of the decrypted data, determines whether or not the request is a legitimate request for device corresponding to the device identifier. If the processing indicates the request is not legitimate, processing terminates and a response indicating the such is returned.

At block 616, assuming device security server 146 determines the request is, in fact, a legitimate request with respect to the identified device, device security server 146 associates the device identifier with the information identifying the particular entity (e.g., individual or organization) as received in the request. For example, device security server 146 may store the device identifier in association with the information identifying the particular entity such as, for example, an account of the particular entity. Device security server 146 may store the device identifier in relation to the information identifying a particular entity in a relational database.

In an embodiment wherein the request to associate a device with an entity additionally comprises a request to activate a device has been received, device security server 146 confirms the activation code that was received is consistent with the activation code that was previously stored for the particular device. Device security server 146 may associate the activation code with the entity.

At block 618, device security server 146 generates and communicates a response to the request. In an example embodiment, the response identifies that the device identifier has been associated with the information identifying the entity as specified in the request.

At the conclusion of the processing at block 618, device security server 146 will have stored thereon for a particular device, information specifying the unique device identifier, authentication information such as a public key, a public key certificate where one has been requested and created, information provided by the manufacturer identifying the device (e.g., a serial number), and information identifying the particular entity associated with the device. Where the processing involved use of an activation code, device security server 146 may have also formed a relation between the activation code and the particular device. This information may subsequently be used by the communication environment 110 to authenticate communications from the particular device, as well as to limit communications to the device to those communications originating from the particular individual or organization that has been associated with the device.

It will be appreciated that while devices 130 may be activated by the owner or purchaser of the particular device as described in connection with FIG. 6, in some circumstances, the provider of the device, such as the manufacturer, may activate the device. The processing is substantially the same, but initiated by the provider of the device rather than the purchaser. In such a scenario, when a device is received by its purchaser, it may have already been activated.

Figure 7:
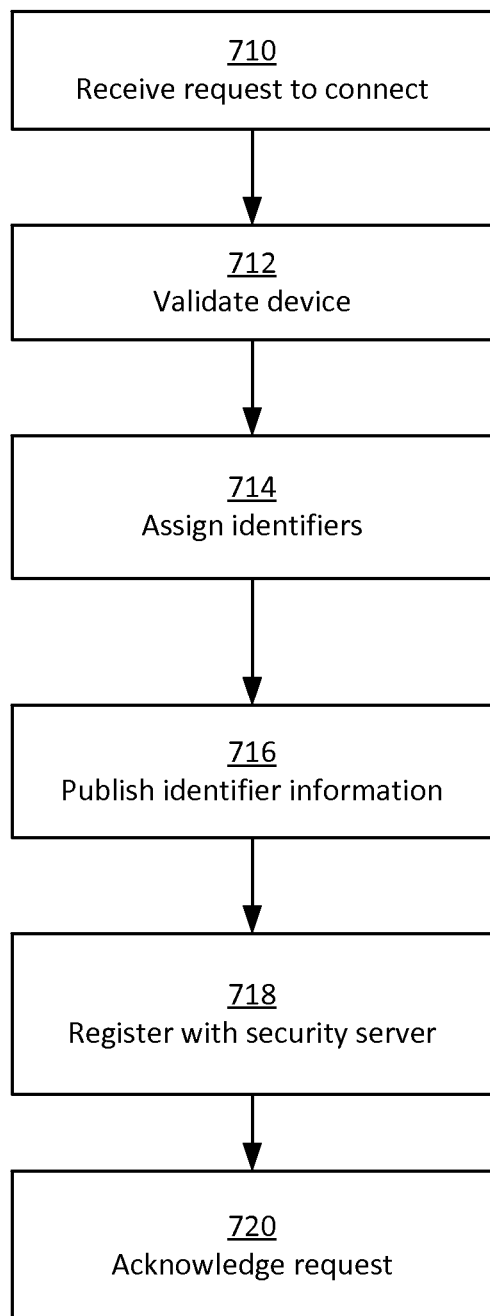
FIG. 7 depicts a flow diagram of an example process for processing device connections.

Once a device has been registered with environment 110 and an entity (e.g., individual or organization) has been associated with a device, the device may communicate with environment 110. FIG. 7 depicts a flow chart of example processing performed in connection with a device 130 initially requesting to connect to computing environment 110. At block 510, gateway server 140 receives a request to connect. The request may be formatted in a number of different formats and may use any number of different protocols such as, for example, HTTPS, CoAP, MQTT, etc. In an example embodiment, the request may comprise a request to start a transport layer security (TLS) session. In such an instance, the TLS session request may include the public key certificate that was generated during the device registration processing as discussed in connection with FIG. 5.

At block 712, gateway server 140 validates or authenticates the particular device. For example, gateway server 140 may determine whether the particular device 130 is one that should be able to access server 140 and environment 110. In an example embodiment, the information that is received and stored during the registration process may be used to authenticate the device when it attempts to communicate with the environment 110. In an example embodiment, the authentication may involve a transport layer security (TLS) handshake. In an example scenario where a TLS session was initiated by a request from device 130, gateway server 140 validates the certificate. Gateway server 140 may communicate with device security server 146 in order to confirm that the received certificate matches the certificate that was previously created during the device registration processing as described above in connection with FIG. 5. In an example embodiment, gateway server 140 may issue a request, which may include the device identifier, to the device security server 146 and receive a corresponding certificate. In an alternate embodiment, the request to the device security server 146 may simply identify the certificate without specifying a particular device identifier, Gateway server 140 may compare the certificate received from the device 130 with the certificate received from the device security server 146.

The validation or authentication processing may further comprise processing an encrypted data item using the public key that was stored in association with the device during registration. For example, device 130 may have encrypted a known data item using its private key of the public-private key pair that was identified and stored with security server 146 during device registration. During the authentication process, gateway server 140 may retrieve the public key from security server 146 and use it to decrypt the received encrypted data. Gateway server 140 evaluates the unencrypted data to determine if the data was, in fact, encrypted using the private key corresponding to the registered public key and, therefore, received from the actual registered device.

It will be appreciated that in addition to gateway server 140 and device security server 140 authenticating device 130, device 130 may request a certificate from gateway server 140. In response, gateway server 140 and/or device security server 146 may generate and/or retrieve a certificate. In an example embodiment, gateway server 140 and/or device security server 146 may generate and transmit a certificate by encrypting a known data item using a private key that corresponds to a public key that may have been exchanged with the device during the registration process. Device 130 evaluates the certificate to determine whether it indicates that device 130 is, in fact, communicating with the intended communication environment 110. For example, device 130 may decrypt the received data using a public key that was provided by device security server 146 during the registration process. If device 130 determines that the decrypted data is acceptable, device 130 can determine that it is communicating with the appropriate environment.

In an example embodiment, in addition to performing certificate exchanges and/or encrypted data exchanges between a device 130 and environment 110, a further internal check may be made prior to allowing for communication between a particular device 130 and environment 110. For example, device security server 146 may maintain information specifying particular devices that have been identified as excluded from communication with environment 110. The particular devices may have previously presented security or operational issues that indicated the devices should not be trusted to communication with environment 110. The information regarding whether devices are excluded may be stored in any manner that is suitable. In an example embodiment, the information may be stored by device security server 146 as an extra memory bit in relation to information about the particular device. Accordingly, device security server 146, after authenticating a device using certificate information, may determine whether the data maintained for the particular device indicates it should be excluded from communicating with environment 110.

In the event that the particular device is not identified as excluded from communication with system 110, device security server 146 communicates with gateway server 140 to indicate that communication with the particular device may proceed.

Assuming gateway server 140 determines that the particular device may connect, at block 714, gateway server 140 may assign a connection identifier for purposes of identifying the particular connection with the particular device in environment 110. Gateway server 140 may assign any suitable identifier. In an example embodiment, gateway server 140 may assign an IPv6 formatted identifier. Gateway server 140 stores any such identifying information that may be assigned to the device 130. Information relating to the particular connection such as the socket used for the connection and the protocol type of the request may be stored with the identifying information for the particular device 130. Any information regarding the device, including any device identifier, connection identifier, port, and/or protocol, are stored in relation to any hardware identifying information for the particular device. For example, the information may be stored in relation to a UUID or MAC address of the particular device.

At block 716, the existence of the device 130 and its connection with the particular gateway server 140 is published so that other gateway servers 140 may reference the information in the future. In an example embodiment, the gateway server 140 to which the particular device connected, requests that distributed hash server 220 store hash values corresponding to the device identifier, the connection identifier, and an identifier for the particular gateway server 140 to which the device connected. This information may be used as described below to locate the particular gateway server responsible for processing requests from the particular device 130.

At block 718, the particular gateway server 140 may register the particular device 130 with device security server 146. For example, gateway server 140 may forward any security-related information regarding the particular device 130 such as any key values that may need to be used during communication with the device. Device security server 146 may provide information regarding any limitations such as roles and policies that may be imposed when the particular device connects to the environment 110.

At block 720, gateway server 140 generates and transmits an acknowledgement of the device having connected with the computing environment via gateway server 140.

Gateway sever 140 may be adapted to support asynchronous messages over both connection-based and connection-less transport protocols between a device endpoint and an endpoint in environment 110. In an example embodiment, gateway server 140 supports message exchange patterns between a device endpoint and a cloud endpoint such as, for example, one-way device to cloud messaging; device initiated request/response messaging; one-way cloud to device messaging; and cloud initiated request/response messaging. In an example scenario wherein a device connects to gateway server 140 using a transport protocol over a persistent connection such as TCP, gateway server 140 associates the specific socket that is used to hold the connection. Generally, connection-based communication protocols such as transmission control protocol (TCP) first establish a communication session, and then use the established session to communicate data. Connection-based communication protocols offer reliable delivery of data through sequencing, error checking, and flow control. Generally, a session is established through a process of a handshake. One the connection is established, data can be reliably sent. Each datagram that is sent is assigned a sequence number. The sequence numbers ensures that the destination computer can reassemble the data is the proper order as it is received. The destination computer will send acknowledgments for segments that are received. If the source computer does not receive an acknowledgement within a certain amount of time, the segment will be retransmitted thus ensuring delivery of information.

The disclosed environment may also employ connection-less communication protocols. Connection-less communication protocols such as, for example, user datagram protocol (UDP), do not rely upon an established connection for communicating data. When information is sent, acknowledgements are not returned so it is just assumed that it has been received. Connection-less protocols are more often used in one-to-many situations where information is sent using a broadcast or for multicasting (TCP is used for one-to-one communication). In an example scenario wherein a device connects to gateway server 140 using a connection-less transport such as UDP, gateway server 140 associates the remote IP and port pair with a connection id.

In an example embodiment, whether or not gateway server 140 tracks the connection state of individual devices depends on the protocol used by the device to communicate with gateway server 140. For example, whether or not gateway server 140 tracks connection state depends upon whether the protocol is stateful or stateless.

In an example scenario, a request may be formatted as a CoAP request. CoAP, by default, uses UDP as the transport. While UDP is considered stateless, CoAP requires state to be maintained about a single message exchange. A message exchange may be defined as a request/response sequence with state maintained by the system if the confirmable message type is used. In an example embodiment, a confirmable CoAP message can be redelivered until a positive ACK is received. Gateway server 140 may keep track of redelivery attempts and whether or not a message exchange has completed. In such an embodiment, message exchange state may be short lived and may not be required after TTL expires. When CoAP is used with UDP, gateway server 140 may not maintain connection state since UDP is connection less.

In another example scenario, requests may be received using the MQTT protocol. Typically, MQTT requires a server to store client state information in an attempt to reduce per-message communication overhead. MQTT also defaults to using TCP as the transport mechanism. When a long-lived TCP connection is used, gateway server 140 maintains the connection state of a device. In such a scenario, an MQTT client can disconnect and reconnect using the same client identifier. Gateway server 140 may maintain MQTT state information per client identifier for QoS level 1 and 2.

SPDY and HTTP/2 support multiplexing data over a single TCP connection. In an embodiment supporting SPDY and HTTP/2, gateway server 140 may maintain connection state for each device and route messages over the opened TCP connection.

Figure 8:
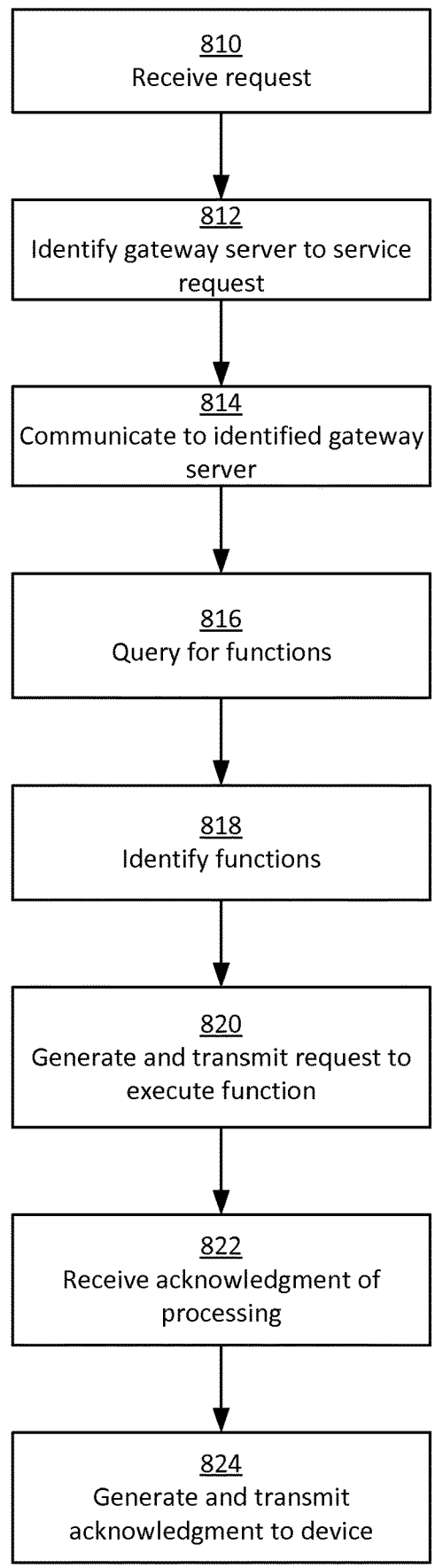
FIG. 8 depicts a flow diagram of an example process for processing device requests for server functions.

FIG. 8 depicts a flow chart of example processing performed in connection with receiving a request to perform a function or command from a device 130 at computing environment 110. As shown, at block 810, a request is received from a device 130 into computing environment 110. In an example embodiment, the request is received at load balancer 21. In an example scenario, the request may be to perform an update function on a data item stored in a network services server 150. In another example scenario, the request may be to perform a particular processing function or command on a particular data item stored in a network services server 150. In some instances, the request itself may not specify a particular function that is being requested, but relies upon computing environment 110, and, in particular, gateway server 140, to identify a function corresponding to a request. In an example scenario, the request may specify a value such as a device measurement and rely upon computing environment 110 to identify that the corresponding requested function is to update a value maintained in the environment for the particular device.

In an example embodiment, application programming interfaces (API's) may be defined for interfacing with gateway servers 140. Different API's may be defined for different communication protocols. For example, API's may be defined for HTPP communications by devices 130 for communication with gateway servers 140. In an example scenario, an API call sendMessageToCloud(deviceId, path, payload) may be defined for HTTP calls by devices 130 to gateway servers 140. This particular call allows the calling device 130 to send a message to computing environment 110. The sendMesssageToCloud call may be called with information specifying values for parameters deviceID, path, and payload. The "deviceID" parameter represents the unique identifier for the device 130 sending the call. The "path" parameter may be a uniform resource locator (URL) path that conveys message type or any other contextual information of the message. In an example embodiment, the "payload" parameter is used to communicate information about the particular function or command that is being requested and is used as an abstract interface to communicate messages to the gateway server 140. The "payload" information may subsequently be operated on by device registry server 142 in order to determine what functions or commands should be executed in system 110 in response to the request. It will be appreciated that since HTTP is a synchronous request/response protocol, it is possible that a call of send MessageToCloud may block until some timeout threshold.

In a further example, an API call longPollMessage( ) may be defined and sent by devices 130. The longPollMessage( ) call may be used by a long poll client in order to determine if there are new messages that were initiated by servers in computing environment 110 for the particular device 130. This message also may effectively block until a timeout threshold.

Gateway servers 140 may also be programmed to accept CoAP messages. In an example embodiment, gateway servers 140 act as a CoAP endpoints over both UDP and TCP. CON message types may be used when interacting with a device 130 over CoAP. If a gateway server 140 receives a request that is not of CON type, in an example embodiment, server 140 may return a Forbidden message. In an example embodiment, the content format supported may be, for example, :50—"application/json," although additional content formats may also be supported.

In an example, embodiment, a CoAP option "65001—AMZN-CORRELATION-ID" may be defined and mapped to a correlation ID. In an example embodiment, the following mappings may be made for a CoAP message: path—mapped to CoAP option URI-PATH; correlation ID—mapped to CoAP option X-AMZN-CORRELATION-ID; payload—mapped to CoAP payload; CoAP content type—always set to 50; CoAP code—always set as POST; and CoAP type—always set as CON.

Gateway servers 140 may still further expose an MQTT endpoint such that devices 130 supporting MQTT can communicate. In an example embodiment, gateway servers 140 may implement a subset of handling behavior for CONNECT, PUBLISH, SUBSCRIBE, and DISCONNECT and their corresponding responses. For SUBSCRIBE, the a valid topic may be /{deviceId}/toDevice. Gateway server 140 may return a SUBACK with failure if an MQTT client attempts to subscribe to any other topic. With respect to PUBLISH, the only valid topic may be /{deviceId}/fromDevice. Gateway server 140 may return a PUBACK with failure if the MQTT client attempts to publish to any other topic.

Referring to FIG. 8 and block 812, in an example embodiment, load balancer server 210 identifies the particular gateway server 140a that should process the particular request. The load balancer 210 at which the request was received may have been provisioned with information indicating that requests from particular devices should be routed to particular gateway servers 210. This information may have been provisioned onto load balancer 210 when the particular device where the request originated first accessed environment 110 via the load balancer 210. Load balancer server 210 queries this information to identify the particular gateway server 140 that should process the particular request. For purposes of illustration, load balancer server 210 may identify that the gateway server 140a is responsible for processing the particular request which may have originated from device 130a.

In an alternate embodiment, load balancer 210 may not have information sufficient to identify the relevant gateway server 140a as responsible for servicing requests from a particular device. In such an embodiment, load balancer 210 may direct a request to a gateway server 140 based upon available resources and without regard as to the particular gateway server that is responsible for servicing the request. Accordingly, it may be the case that the gateway server 140 that receives the request from load balancer 210 may not be the gateway server 140 associated with or responsible for processing request from the particular device 130. For example, the request may be received at a gateway server other than the one that previously communicated with the device. Accordingly, at block 812, the gateway server 140 at which the request was received identifies another gateway server to service the request. In such an embodiment, the gateway server 140 may query distributed hash server 220 to identify a gateway server 140 that corresponds to the particular device 130. In an example scenario, gateway server 140 generates a hash value of an identifier, e.g., device_id, for the particular device 130 from which the request was received. The hash function is the same as that used when the device previously accessed the system. In an example scenario, the hash value is taken of the device identifier associated with the particular device. The generated hash value is used to query the distributed hash server 220 in order to locate a gateway server that is responsible for responding to the request.

As noted above, in an example embodiment, distributed hash server 220 comprises a consistent hash ring wherein hash values of identifiers of gateway servers 140 and are included in hash ring in addition to hash values of the device identifiers and connection identifiers. In such an embodiment, hash server 220 first locates the hash value corresponding to the device identifier on the hash ring. Hash sever 220 then locates the hash value of a gateway server that corresponds to the located has value of the device identifier. In an example embodiment, hash server 220 locates the hash value of a gateway server that is located in proximity on the ring to the hash value of the particular device identifier. The located hash value of a gateway server corresponds to the gateway server responsible for the particular device from which the request was made. In an example embodiment, hash server 220 locates the hash value corresponding to the device on the hash ring and then moves clockwise on the ring until finding a hash corresponding to a gateway server. The first gateway server hash located upon moving in a clockwise direction corresponds to the gateway server responsible for responding to the request.

Referring to FIG. 8, at block 814, the request is communicated to the identified gateway server 140 for processing.

At block 816, the identified gateway server 140 queries for logic, policies, or rules for processing the request. In other words, gateway server 140 determines what processing is needed in order to respond to the request. In an example embodiment, the identified gateway server 140 is programmed to receive and process requests that include payload information specifying a particular function that is requested to be implemented. The identified gateway server 140 may also be programmed to receive and process requests that do not explicitly specify a particular function. In an example scenario, a request may be received from a device such as, for example, a thermostat, that includes information identifying the device, e.g., a device identifier, and payload information identifying a temperature reading value from the thermostat. The identified gateway server 140 may be programmed to use the information that is specified in the request in order to identify a corresponding function. In an example embodiment, the identified gateway server 140 may be programmed to query a data store for a particular function that corresponds to information that is provided in the request from the device. The data store may comprise information specifying for particular devices and particular information or data items that may be received from the particular device, a corresponding function that is intended. In an example scenario, the data store may comprise information that specifies for a request received from a particular device identifier that includes a payload with a temperature reading, a store function should be interpreted to have been requested. In an example scenario, the identified gateway server 140 may query the data store, which may be comprised on gateway server, for a particular function that corresponds both to the requesting device, which may be specified by a device identifier, and a data item such as an instrument reading value included in the request payload. Accordingly, in scenarios where the request does not explicitly specify a requested function, the identified gateway server 140 may be programmed to determine a requested function for a request from a device, based at least in part on information such as a device identifier and payload information from the request.

It will be appreciated that a gateway server 140 may need to process requests from a wide assortment of devices 130. For example, devices 130 may be smart phones, pressure sensors, light switches, or any other type of device. The various devices 130 may have different functions or commands that are particular to the particular device or type of device. For example, a device 130 that is a smart phone may communicate commands to gateway server 140 relating to a current location and/or requests for locations of other smart phones. Meanwhile, a sensor device located in a manufacturing facility may communicate messages providing updates relating to pressure readings. Further, the devices 130 may use different protocols when communicating with environment 110 and, in particular, gateway server 140. For example, some devices 130 may forward HTTPs formatted commands. Other devices 130 may forward message queue telemetry transport (MQTT) formatted messages. Still other devices may transmit constrained application protocol (CoAP) formatted messages.

Because there are so many variations in the types and formats of request received, the identified gateway server 140 determines for the particular request from the particular device 130 what responsive actions should be taken. As part of this processing, gateway server 140 converts the requests/messages that it receives from devices 130 into a format that may be used by systems in computing environment 110. For example, for a message received from a device, gateway server 140 may generate a JSON document the contents of which represent the values for parameters in the call received from a device 130. An example JSON document may be as follows:

```
{
    {"header": {
        "deviceId" : "2323-3542-2213543",
        "path" : "/shadow/state",
        "correlationId" : "123-435-423454"
        }
    },
    {"body": {
        // whatever was passed in from developer as the payload.
        }
    },
    {"diagnostic" : {
        "connectionId" : "3433-23454-134543",
        "receivedTS" : "343254363446", //in UTC
        "some more diag" : "TBA"
        }
    }
}
```

In such an embodiment, values for document elements such as, for example, deviceID, path, correlationID, and body may be taken from the API call that was received by the gateway server 140. The value for "body" element may correspond to a payload provided by the API call and may be used to determine the specific function within computing environment 110 that is intended to be performed.

In an example embodiment, the identified gateway server 140 queries for processing actions or functions that should be taken in response to the particular request for a function from the particular device. In an example embodiment, device registry server 142 comprises data specifying logic or rules for determining processing functions or commands that should be executed in response to requests for particular functions or commands from particular devices or devices having particular characteristics. In such an embodiment, at block 614, the identified gateway server 140 communicates a request to device registry server 142. The request may specify the function or command received from the device 130 along with any related data including the particular device from which the request was received. In an example embodiment, the request is formatted using JavaScript object notation (JSON) and includes the command or function that was received from the device 130 along with any data corresponding to the request. In a particular embodiment, the request may be formatted as in the example of the preceding paragraph. In such an embodiment, the command or request may be specified in the "body" portion of the JSON document.

Device registry server 142 queries its records of rules to identify functions or commands that should be executed in response to the request for the particular functions or commands from the particular device 130. For example, device registry server 142 may determine that the particular request received from the particular device 130 corresponds to a request to perform a storing function on data in network services server 150. In other words, device registry server 142 may determine that the particular function received from the particular device 130 corresponds to a services function performed by a services server 150. In an alternative scenario, device registry server 142 may determine that the particular request from the particular device 130 corresponds to a request to perform predefined processing function or command at network services server 150. It will be appreciated that the data and logic of device registry server 142 allow for differentiating functions and commands based upon the particular commands and the particular device from which the commands were received.

Device registry server 142 formats and transmits a response to the gateway server 140. The response specifies the particular services functions or commands that should be executed in response to the request from the particular device 130. In an example scenario, the response may specify to request that one or more services functions or commands be executed that stores a particular data item in a particular network services server 150. In an alternative scenario, the response may specify that a particular function or command be called that performs a particular processing operation on a particular data item at a particular network services server 150. In an example embodiment, the response is formatted as a JSON document.

At block 818, the identified gateway server 140 identifies the actions that should be taken in response to the request. In an example embodiment, the gateway server 140 receives the response from device registry server 142 specifying the processing functions or commands that should be executed in response to the request from device 130. At block 818, the identified gateway server 140 may parse a JSON document returned by device registry server 142.

At block 820, the identified gateway server 140 generates and transmits a request for processing consistent with the responsive information received from device registry server 142. In an example embodiment, identified gateway server 140 generates and transmits a request to the dispatcher server 230 to implement one or more services functions or commands identified in the response received from device registry server 142. The request generated by the identified gateway server 140 may be formatted as a JSON document or contain JSON formatted text.

In response to the request, dispatcher server 230 generates and formats one or more requests to other of servers in environment 110. For example, when dictated by the request from gateway server 140, dispatcher server 230 formats and generates requests to network services server 150 to execute one or more functions. In an example scenario, the request may specify performing a function or command to store a data item at network services server 150. In other words, the request may specify performing a function or command to perform a services function at services server 150. In another example scenario, the request may specify that network services server 150 perform a particular processing function or command on a particular data item. When the processing is completed, dispatcher server 230 receives a response, including any resulting data from network services server 150. Dispatcher server 230 communicates a response, including any responsive data, to gateway sever 140.

At block 822, the gateway sever 140 receives the response. In an example scenario, the response may comprise data and/or an acknowledgement that one or more functions were executed.

At block 824, the identified gateway server 140 generates and transmits a response to the particular device 130 that generated the initial request. In an example embodiment, gateway server 140 may communicate a request to device registry 142 for information relating to formatting of an appropriate reply to the particular device 130. The request may specify the particular responsive information received by gateway server 140 as well as identify the particular device from which the original request was received. Device registry server 142 uses its rules and logic to identify for the particular device an appropriate format for providing the responsive information. For example, device registry server 142 may determine the particular function or command that should be requested as well as the format of the particular command. Upon receiving any information needed for formatting the response, gateway sever 140 communicates the response to the device 130 from which the original request was received.

Accordingly, gateway server 140 operates to receive requests to perform particular functions or commands, converts those functions or commands to appropriate functions for execution within the computing environment 110, and returns results in a format accepted by the requesting devices 130.

According to another aspect of disclosed embodiments, gateway server 140 operates to route data and commands originating from within the environment 110 or from external servers 160 to devices 130. In the instance where the request originates from within environment 110, the request can generally be assumed to be valid. However, for requests that originate from outside of environment, such as from an external server 160, computing environment 110 is adapted to validate that the request was made by an entity (e.g., individual or organization) that is authorized to make the request.

Figure 9:
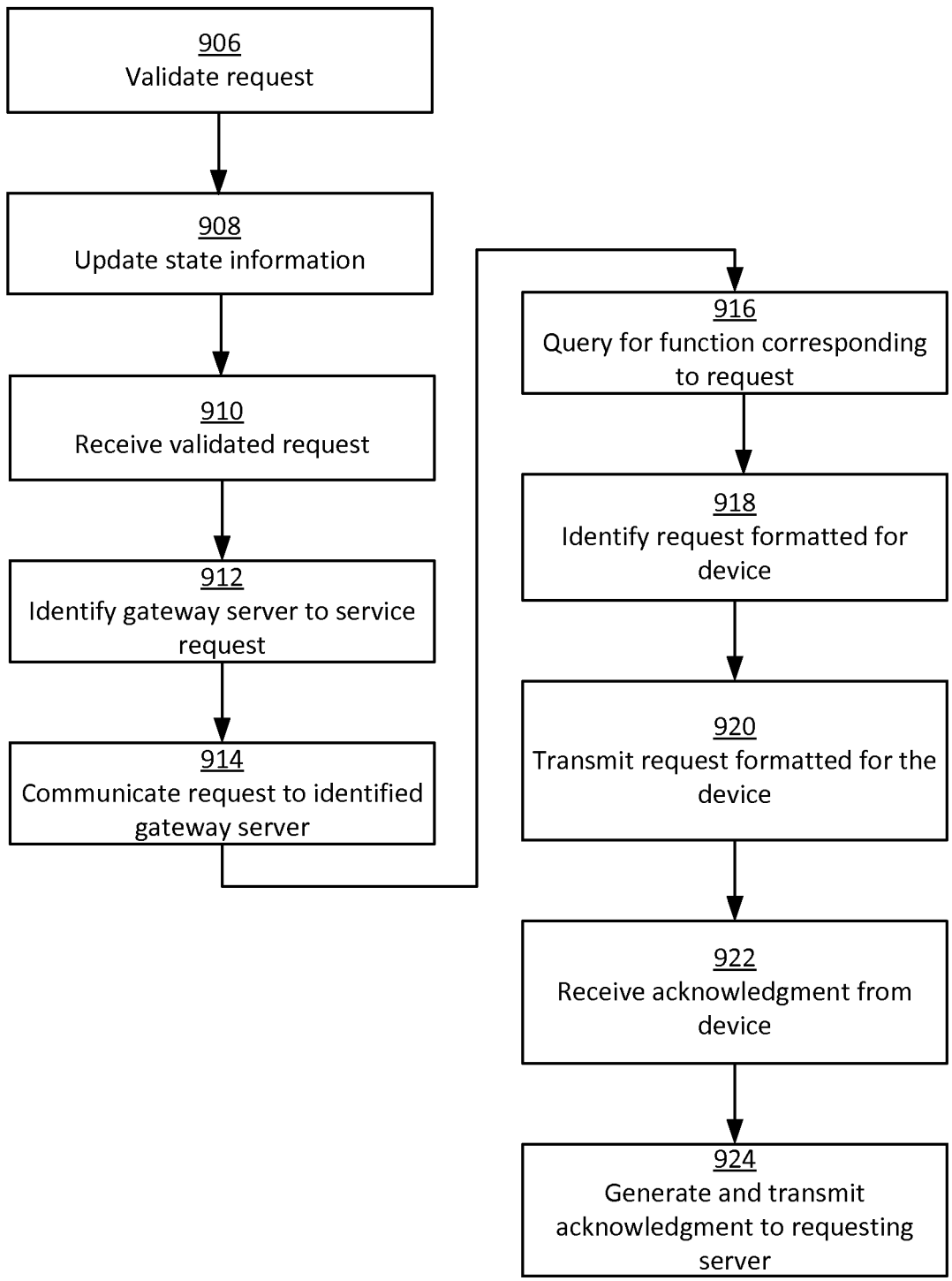
FIG. 9 depicts a flow diagram of an example process for processing server requests for device functions.

FIG. 9 depicts a flow chart of example processing of requests from environment 110 directed to a device 130. In the depicted processing, optional processing at block 906 applies to requests received from external to environment 110 which may require validation of the request. In an example scenario, the owner or operator of a particular device may wish to have the particular device perform a particular action or to assume a particular state. For example, where the device is a dishwasher, the owner of the dishwasher may wish to have the dishwasher run a clean cycle. In an example embodiment, the owner of the device, who previously registered as the entity (e.g., individual or organization) associated with the device, may use an application such as an application on a mobile device to request that the particular device perform a particular operation. The request may be communicated by a third party service 160 maintained by or for the manufacturer of the device, which communicates the request to environment 110. In an alternative embodiment, the mobile application may directly communicate with environment 110.

In an example embodiment, a request from an external system 160 may be received at device security server 146. In an example embodiment, the request comprises information identifying the particular entity (e.g., individual or organization) from which the request originated, the device identifier for the particular device that the user is interested in communicating with, and the requested operation that is being requested, which may be formatted as a payload to the request. In an example scenario, the requested control or operation may specify that the identified device assume a desired state.

Device security server 146 processes the request to confirm that the entity (e.g., individual or organization) from which the request was received, is, in fact, an entity designated to control the particular device. Device security server 146 compares the entity (e.g., individual or organization) identification information specified in the request with the information identifying an entity that was captured and stored by device security server 146 during the registration process as described above. More particularly, device security server 146 validates that the information previously stored for the device identified in the request indicates the particular entity (e.g., individual or organization) specified in the request is authorized to communicate with the device. If device security server 146 determines that the user is not authorized, processing of the request terminates and a corresponding communication is generated and transmitted to the system from which the request originated.

Assuming the entity (e.g., individual or organization) specified in the request is determined to be authorized to communicate with or control the particular device, at optional block 908, the request is processed at device shadow server 144, which maintains state information for each of the devices registered with the system. In one example embodiment, device shadow server 144 updates the state information for the device consistent with the request. For example, device shadow server 144 may update the desired state for a device to match the state specified in the request. In an example scenario wherein the request is to change the operating state of a dishwasher device to indicate the dishwasher is to run a clean cycle, the desired state is changed to reflect the new state. Device shadow server 144 may forward a corresponding request to implement the desired change of state.

As shown, at block 910, gateway server 140 receives a request or message from within environment 110 that requires communicating with a device 130. The request or message may specify, for example, a particular device identifier corresponding to a particular device, or may specify a particular connection identifier, which corresponds to a connection with a particular device. The request or message may further include a payload, which may be, for example, an action such as a function or command that is requested as well as any data corresponding to the request. In an example scenario, device shadow server 144 may transmit a request to gateway server 140 to change the operating or processing status or state of a particular device 130 or particular connection. The request may specify a particular state, actual and/or desired, that a particular device or connection should assume. Device shadow server 144 may issue a request to change status or state in response, for example, to receiving an indication from an external server 160 or from an application such as network services server 150 to change the device status or state. In an alternative scenario, gateway server 140 may receive a request from dispatcher server 230 to send a message to the device. Dispatcher server 230 may issue the request in response, for example, to a request from a network services server 150. It will be appreciated that servers within environment 110 may use API calls to communicate requests to gateway server 140. In an example embodiment, HTTP API calls may be used by applications to request that messages be sent to particular devices. An example API call may be, for example, sendMessageToDevice(connectionId, path, payload) which when called causes gateway server 140 to send an async message to the device 130 identified by the "connectionId" parameter. The "path" parameter may be, for example, a URL path that is passed through to the device and which identifies message type or any other contextual information of the message. In an example embodiment, the "payload" parameter is meant to hold information specifying instructions for performance by the particular device 130 which ultimately receives the instruction. In an example embodiment, the "payload" parameter may be a JSON formatted document. In such an instance, the JSON document represents the abstract interface for an application/service to send messages to a device 130. It will be appreciated that the implementation details may differ based on the communication protocol used by a particular device 130. Another example API call may be sendResponseToDevice (connectionId, correlationId, path, payload) which when called causes gateway server 140 to send an async response to an earlier message. The format of this particular call is similar to sendMessageToDevice with the exception that sendMessageToDevice( ) also includes a parameter "correlationId" which may be used to correlate the response to a previous request.

At block 912, the gateway server 140 that received the request determines which gateway server 140 of the several that may exist should handle the request. As noted in the discussion of FIG. 2, there may be many gateway servers 140. It may be the case that the gateway server 140 that receives the request may not be the gateway server 140 associated with or responsible for processing request for the relevant device 130. Accordingly, at block 712, the gateway server 140 at which the request was received identifies a gateway server to service the request. In an example embodiment, the gateway server 140 queries distributed hash server 220 to identify a gateway server 140 that corresponds to a particular device or, in some instances, corresponds to the particular connection that is identified in the request. In an example scenario, gateway server 140 generates a hash value of an identifier which may be, for example, a connection identifier for a particular device or a device identifier. The hash function that is used to generate the hash value is the same as that used when the device previously accessed the system to generate a connection. The generated hash value is used to query the distributed hash server 220 to locate a gateway server that is responsible for responding to the request.

In an example embodiment, distributed hash server 220 comprises a consistent hash ring wherein identifiers of gateway servers 140 are included in hash ring in addition to hash values of the device identifiers and connection identifiers. In such an embodiment, hash server 220 first locates the hash corresponding to the connection identifier on the hash ring. Hash sever 220 then locates the hash of a gateway server that is located in proximity on the ring. The located hash of a gateway server corresponds to the gateway server responsible for the particular connection with the desired device. In an example embodiment, hash server 220 locates the hash corresponding to the device on the hash ring and then moves clockwise on the ring until finding a hash corresponding to a gateway server. The first gateway server hash located upon moving in a clockwise direction corresponds to the gateway server responsible for responding to the request.

Upon identifying a particular gateway server, at block 914, the request is communicated to the identified gateway server 140 for processing. In an example embodiment, the request comprises information specifying the connection identifier for communicating with a particular device.

At block 916, the identified gateway server 140 queries for or performs processing to identify a function or command corresponding to that specified in the original request. In an example embodiment, identified gateway server 140 may request that device registry server 142 format the request for the particular connection with the particular device. Device registry server 142 may comprise rules or logic that indicates for particular functions or commands that may be issued by servers in environment 110, corresponding functions, commands, data, and formatting for requests to be sent to particular devices. Accordingly, at block 916, device registry server 142 may query to identify a function or command compatible with the identified connection and corresponding to a function or command specified in the original request. In an example scenario wherein the original request received from shadow server 144 indicates to change an actual and/or desired processing state or status, device registry server 142 identifies for the particular device and connection, the appropriate function or command and the appropriate protocol formatting.

At block 918, the identified gateway server 140 identifies the actions that should be taken in response to the request. In an example embodiment, the gateway server 140 receives the response from device registry server 142 specifying the processing functions or commands that should be executed in response to the request from shadow server 144. At block 918, the identified gateway server 140 may parse a JSON document returned by device registry server 142.

At block 920, the identified gateway server 140 communicates to the desired device 130 the identified request including any function or command appropriate for the device and corresponding to that in the original request. The request is formatted as needed for the particular connection to the particular device. In an example scenario, the request may be formatted as CoAP request and specify a message indicating to change status. In another scenario, the request may be formatted as a MQTT publish request and specify a new value for use by the device. In still another scenario, the request may be formatted as an HTTPs request and specify a message indicating to change status of an operating parameter.

It will be appreciated that the identified gateway server 1440 communicates with the desired device 130 consistent with the connection type maintained for the particular device. For example, where the connection with a device is a connection-based connection that employs a connection-based communication protocol such as TCP, gateway server 140 transmits the request or message over the connection-based connection using the connection-based protocol upon identifying or generating the particular request or message. In the scenario wherein the connection is a connection-less connection that employs a connection-less communication protocol such as UDP, and the particular device is not currently connected, gateway server 140 may wait for the particular device to connect with the gateway server 140 before transmitting the request or message and may use the connection-less communication protocol.

At block 922, the identified gateway server 140 receives acknowledgment of the request. In an example scenario, the identified gateway server 140 may receive a CoAP acknowledgement. In another scenario, the identified gateway server 140 may receive a MQTT publish back message.

At block 924, the identified gateway server 140 communicates an acknowledgment to the particular device that requested that the message be sent. For example, the identified gateway server 140 may communicate an acknowledgement to device registry server 142 or dispatcher server 230 as appropriate.

It will be appreciated that during the operation of the of the environment 110, useful data is collected regarding the devices and their operation. For example, as the devices change states, device shadowing server 144 captures the various states, the durations the devices were in the various states, the requests that resulted in the change in states, etc. Likewise, as requests to perform functions are received at gateway server 140 from devices, the particular requests, the functions performed in response to the request, and the timing of the requests are captured by the gateway server 140 and the device registry server 142. Services systems 150 that provide services in response to device requests likewise collect data about the requests, the functions performed, etc.

The data that is collected over time by the systems comprised in environment 110 may serve as a useful resource by which to evaluate the operation of the devices. The collected data reflects operations across multiple devices and device types and may provide valuable insights that may be used to improve operation of devices.

Figure 10:
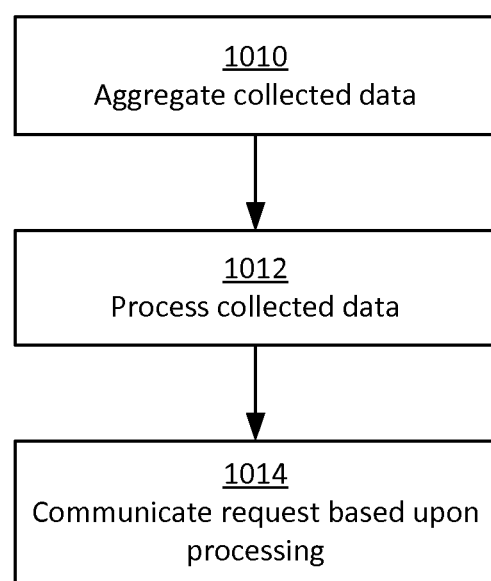
FIG. 10 depicts a flow diagram of an example process for processing aggregated data.

In an example embodiment, a server, which may be, for example, a services server 150, may use the data that has been collected over time to evaluate future data or commands to be sent to the one or more devices 130. FIG. 10 depicts a flow chart of an example process for evaluating collected data. As shown, at block 1010, a services server 150 may aggregate relevant data collected over time relating to devices 130. For example, services server 150 may aggregate data collected by device shadow server 144 relating to device states including, for example, the various states entered by the various devices, the duration the devices were in the states, the requests that resulted in the state transitions, and any other relevant information. Services server 150 may collect and aggregate data from gateway server 140 and device registry server 142 regarding the requests to perform functions that were received, the functions that were performed in response to the requests, the timing of the requests, etc. Services server 150 may also interface with other services servers that may have been receiving and collecting data from various of the devices over time. For example, a particular services server 150 may have been receiving via the communication environment 110 data relating to various traffic monitoring devices such as cameras and motion detectors. At block 1010, the data collected from the traffic monitoring devices may be aggregated for evaluation.

At block 1012, the services server 150 processes the aggregated data. The processing may involve determining whether the aggregated data indicate particular commands or data should be communicated to particular devices. For example, state information aggregated for a series of light devices may indicate that the lights have consistently been in an "on" state during hours when the building in which the lights are situated is closed. In such an instance, services server 150 may determine to send commands to the light devices to switch to an "off" state during particular hours of the day. In another example scenario, data aggregated from another services server for various traffic monitoring devices (e.g., motion detectors, cameras, etc.) may indicate that traffic in the area of the devices increases at a particular time on particular days of the week. In such an instance, services server 150 that aggregated the data may determine to send commands to traffic signal devices (e.g., stoplights) in the area to change the duration and pattern of traffic light changes (e.g., how long a light is maintained as green).

Referring to FIG. 10, at block 1014, the services server 150 that aggregated and processed the data, communicates commands and/or data consistent with the determination made by the server based upon the aggregated data. For example, in the scenario wherein the processing identified several light devices that were on during hours when a building is in use, the services server 150 may communicate commands to the light devices to switch to an off state during particular hours of the day. In the scenario wherein the processing identified from data collected at traffic monitoring devices that traffic in the area of the devices increases at a particular time on particular days of the week, the services server 150 may communicate commands, via gateway 140, to the traffic signal devices (e.g., stoplights) in the area to change the duration and pattern of traffic light changes (e.g., how long a light is maintained as green).

It will be appreciated that the types of data that is aggregated and the corresponding processing of that data may vary greatly. Likewise, the commands that are taken in response to the processing of the data may vary greatly depending upon the types of devices and the actions that they perform. In all events, however, the device communication system 110 allows for the aggregation of data, processing of the data, and communication of responsive commands to devices based upon the evaluation of the data.

Example Device State Management Features

Figure 11:
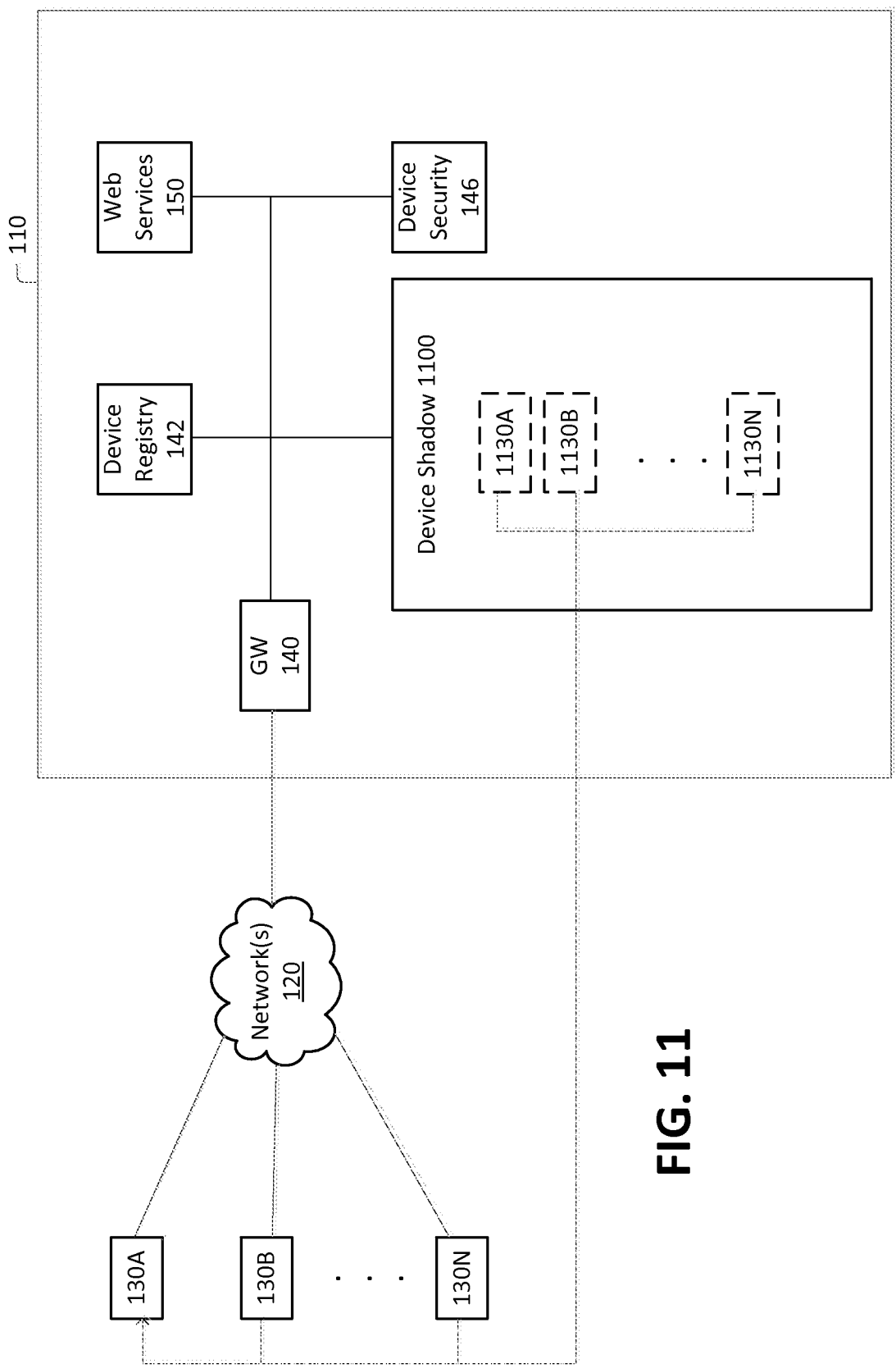
FIG. 11 depicts an example computer networking architecture for device state management.

FIG. 11 depicts an example computer networking architecture for device state management. The architecture of FIG. 11 is identical to the architecture previously depicted in FIG. 1, with the exception that FIG. 11 explicitly shows a group of cached device representations 1130A-N within device shadow 1100. In particular, each device representation 1130A-N corresponds to a respective connected device 130A-N and includes cached information for the respective connected device 130A-N. As will be described in greater detail below, each cached device representation 1130A-N may include one or more device state representations for the respective device 130A-N. In some examples, the device state representations may indicate various device states. For example, for a light, the device state representations may indicate power states, such as Power=On or Power=Off, and/or color states such as Color=Red, Color=Yellow, Color=Green. As another example, for a sensor, the device state representations may indicate particular pressure readings or ranges of pressure readings.

Also, in some examples, the device state representations may include both actual device state representations and desired device state representations. For example, when a device reports that it has assumed a first state, an actual device state representation for the device may be updated to indicate that the device has assumed the first state. A request may subsequently be received from an application for the device to assume a second state. In response, a desired device state representation for the device may be updated to indicate that a request has been issued for the device to assume the second state. The device may then be instructed to assume the second state, and the device may then report that it has assumed the second state. The actual device state representation may then be updated to indicate that the device has assumed the second state, and the desired device state representation may then be cleared such that it ceases to indicate the second state.

Figure 12:
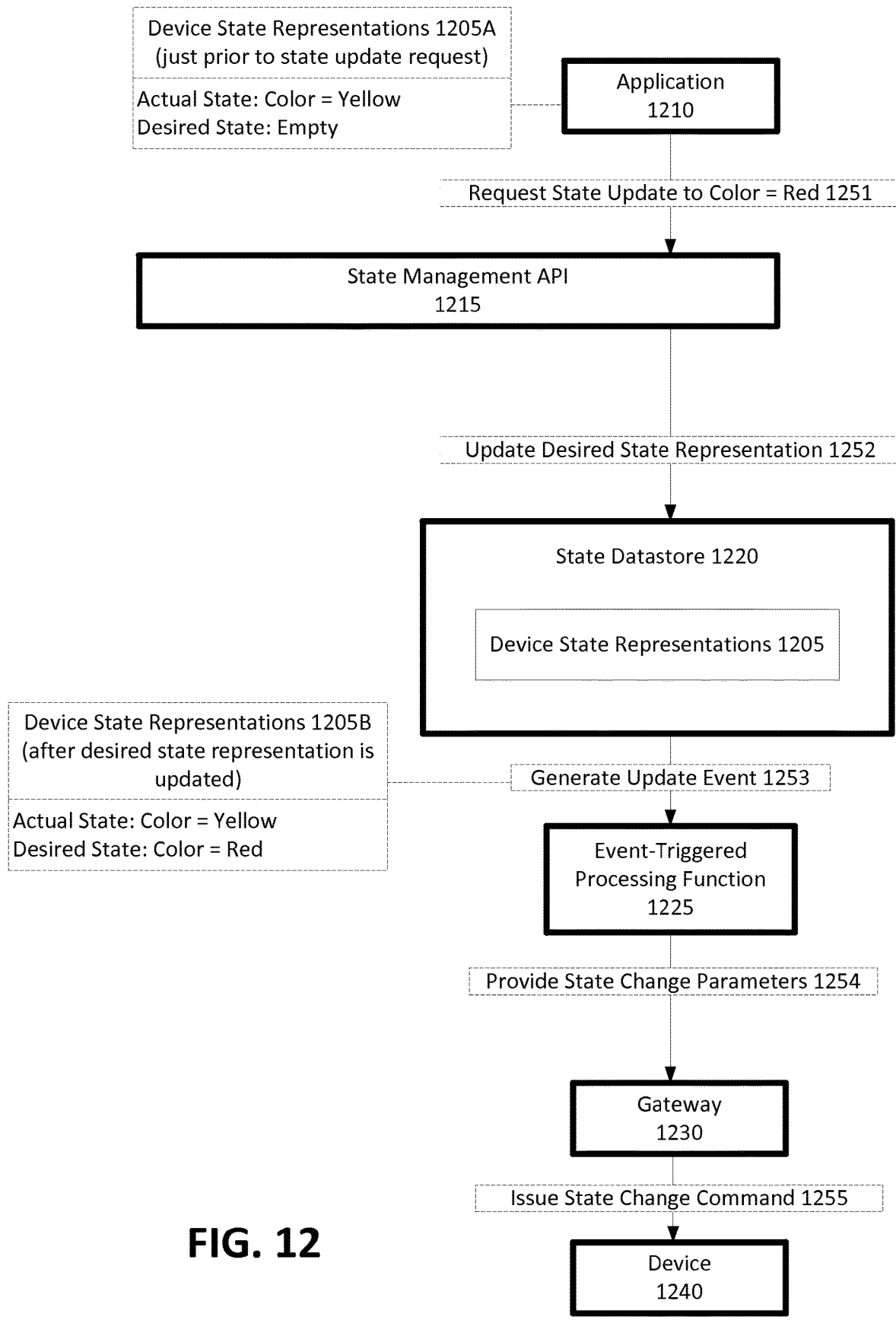
FIG. 12 depicts an example system for requesting a state change to a device.
Figure 13:
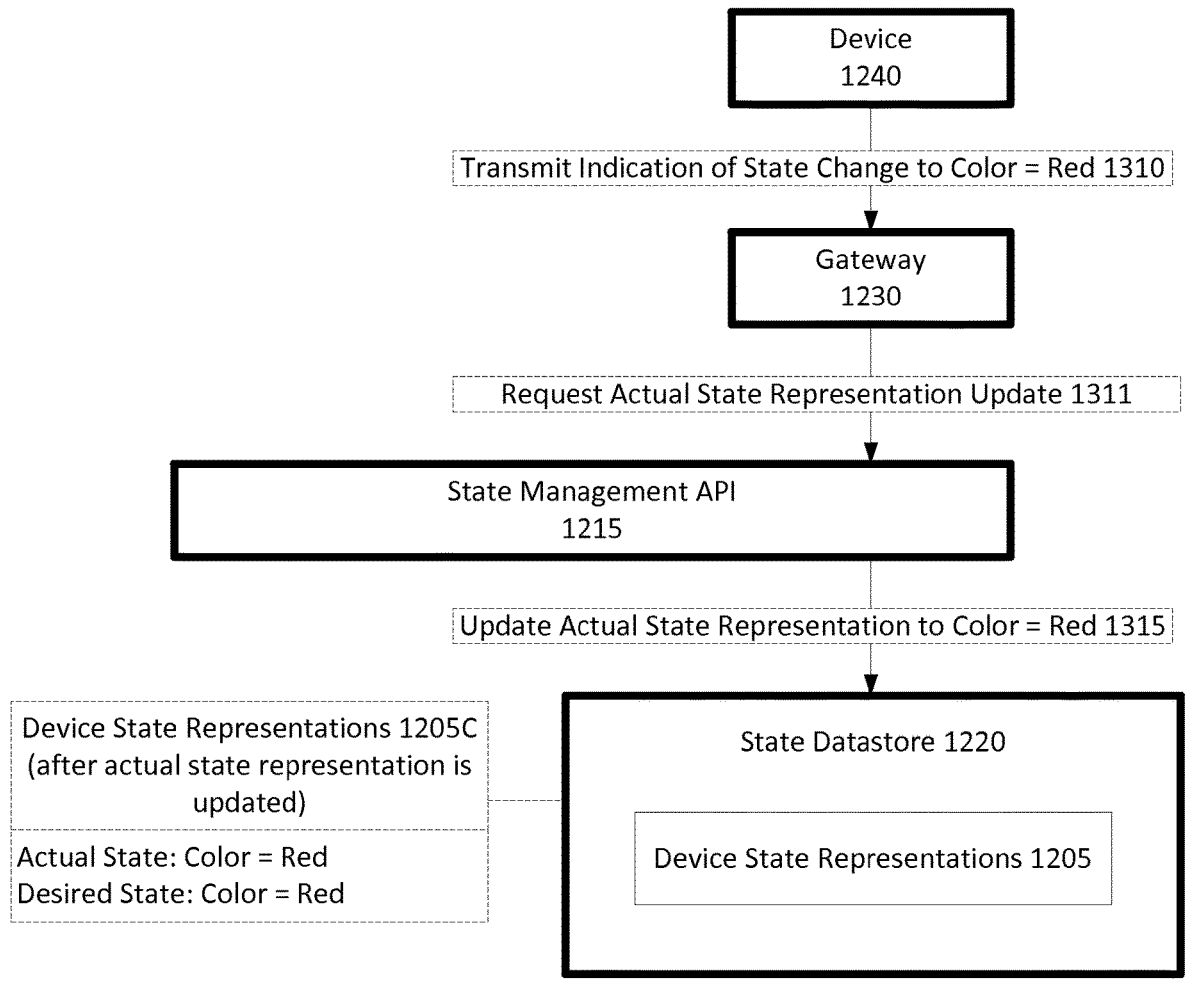
FIG. 13 depicts an example system for receiving and processing a state change indication from a device.

FIG. 12 depicts an example system for requesting a state change to a device. In particular, as shown in FIG. 12, application 1210 may interact with a state management application programming interface (API) 1215 to issue various requests with respect to a device 1240. In the particular example of FIG. 12, the device 1240 may be a light with color states such as Color=Red, Color=Yellow, and Color=Green. The state management API 1215 may interact with a state data store 1220 to process requests from the application 1210, such as by writing information to the state data store 1220 and/or reading information from the state data store 1220. The state data store 1220 may include device state representations associated with various connected devices, such as device 1240. For example, state data store 1220 may store device state representations 1205 corresponding to device 1240. Device state representations 1205A-C are shown in FIGS. 12 and 13 to depict the changing values of device state representations 1205 at various different state update stages. In particular, as shown in FIG. 12, device state representations 1205A indicate the values of device state representations 1205 just prior to application 1210 issuing a state update request 1251, which will be described below. Specifically, device state representations 1205A show that an actual state of device 1240 is Color=Yellow and that a desired state of device 1240 is empty. The actual state value (i.e., Color=Yellow) indicates that Color=Yellow is the last state reported by device 1240. The desired state value (i.e., empty) indicates that no request to change the state of device 1240 is currently being processed. Application 1210 may for example, obtain an indication of the device state representations 1205A by issuing one or more state read requests, which are described in greater detail below.

In the particular example of FIG. 12, application 1210 may issue a request 1251 for the device 1240 to update its state to Color=Red (i.e., to assume the color red). Application 1210 may issue the request 1251 to state management API 1215. The request may, for example, identify the device 1240 using a device identifier, which, as set forth above, may be a unique identifier assigned to the device. Upon receiving the request 1251, state management API 1215 may begin to process the request 1251 by issuing an update instruction 1252 for state data store 1220 to update the desired state representation for the device 1240. In particular, because the request 1251 is for the device 1240 to assume the Color=Red state, the request 1251 will cause the state data store 1220 to change the desired state representation for the device 1240 from empty to Color=Red. This change is reflected in device state representations 1205B, which show the device state representations 1205 after the desired state representation is updated from empty to Color=Red in response to request 1251. It is noted that, in device state representations 1205B, the actual device state representation remains as Color=Yellow. This is because device 1240 has not yet changed its actual state to Color=Red or reported any such change to its actual state.

It is noted that, similar to request 1251, the desired state representation update instructions 1252 may also identify the device 1240 by its corresponding device identifier. Upon receiving update instructions 1252, the state data store 1220 may use the device identifier to access and edit the device state representations 1205 for the device 1240. In some examples, state data store 1220 may be a key value data store, which may use information, such as device identifiers, as a key value by which device state representations may be organized, accessed, and edited.

Upon updating the desired state representation (as shown in state representations 1205B), the state data store may generate, or cause to be generated, an update event 1253 indicating that the state representations 1205 for the device 1240 have been updated. In some examples, the event triggered processing function 925 may be a cloud-based function, while, in some other examples, the event-triggered processing function 925 may be a local function that is local to state datastore 920, state management API 915, and/or other associated components. The update event 1253 may trigger an event-triggered processing function 1225 to execute various instructions for further processing of the state representation update. The event-triggered processing function 1225 may, for example, obtain the device identifier for device 1240 as well as information regarding the actual state representation value for device 1240 (i.e., Color=Yellow) and the desired state representation value for device 1240 (i.e., Color=Red). In some examples, the event-triggered processing function 1225 may then compare the actual and desired state representation values in order to determine that the desired state differs from the actual state. Upon determining that the desired state differs from the actual state, the event-triggered processing function 1225 may provide state change parameters 1254 for the device 1240 to gateway 1230. The state change parameters 1254 may, for example, indicate the device identifier for device 1240, the desired state (i.e., Color=Red), and the actual state (i.e., Color=Yellow).

It is noted that the event-triggered processing function 1225 is merely one non-limiting example of how an update to a desired state representation may be identified and processed to generate state change parameters 1254. In some examples, the event-triggered processing function 1225 may consume computing resources only at times when it is triggered and invoked in response to a state representation update event. Accordingly, event-triggered processing function 1225 may, in some examples, be more efficient than other processing functions or components that execute continuously or that regularly consume computing resources. By reducing the use of computing resources, event-triggered processing function 1225 may reduce costs and improve efficiency with respect to processing of state change requests. It is noted however, that the disclosed techniques are not limited to the use of an event-triggered processing function 1225 for processing of state change requests and that any other appropriate processing functions or components may be employed in addition, or as an alternative to, event-triggered processing function 1225. Also, in some examples, state data store 1220 may be capable of directly contacting or notifying gateway 1230 of state change updates, including changes to the desired state.

Upon receiving the state change parameters 1254, gateway 1230 may issue a state change command 1255 to the device 1240. In some examples, gateway 1230 may generate the state change command 1255 by converting the information within the state change parameters 1254 into a format that the device 1240 can understand. For example, the state change parameters 1254 may sometimes be provided as a JSON (JavaScript Object Notation) formatted message, and the gateway 1230 may convert the JSON message into a binary or other format that can be processed by the device 1240. Upon receiving the state change command 1255, the device 1240 may change its state to the desired state indicated by the command, which, in the example of FIG. 12, is the Color=Red state.

When the device 1240 changes its state its state to Color=Red, the device 1240 may report an indication of the state change, which may, in turn, cause the actual state representation for the device 1240 to be changed to Color=Red. Referring now to FIG. 13, an example system for receiving and processing a state change indication from a device will now be described in detail. In particular, as shown in FIG. 13, once the device 1240 has changed its state from Color=Yellow to Color=Red, the device 1240 may transmit an indication 1310 of the state change to Color=Red. The indication 1310 may be received by gateway 1230, which may, based on the indication 1310, generate a request 1311 to state management API 1215 to update the actual state representation for the device 1240. The gateway 1230 may, in some examples, generate the request 1311, at least in part, by converting information from a format of the indication 1310 into to a different format. For example, the indication 1310 may sometimes include information transmitted from the device 1240 in a binary format, and the request 1311 may sometimes include information converted to a JSON format. The request 1311 may include, for example, the device identifier for device 1240 as well as an indication of the change of the actual device state to Color=Red.

Upon receiving the request 1311, the state management API 1215 may perform, within state data store 1215, an update 1315 of the actual state representation for the device 1240 from Color=Yellow to Color=Red. Device state representations 1205C indicate the values of device state representations 1205 after the performance of update 1315. In particular, as shown by representations 1205, the actual state representation is changed to Color=Red.

When a light changes colors, the light may often change immediately or nearly-immediately from a current state to a desired state. However, in some examples, it may not be possible and/or desirable for a device to immediately change from a current state to a desired state. In one particular example, it may be possible to request a desired speed state for a vehicle motor. In this example, when a large change in speed is requested (e.g., a change from 0 revolutions per minute (rpm) to 100 rpm), an immediate change from a current state to a desired state could result in motor burn or other motor damage. Thus, it may sometimes be desirable for a device to assume various intermediate states before it transitions to a desired state. Accordingly, in these and other cases, additional desired and/or reported states may sometimes be employed. In particular, in some examples, some additional states may be used to indicate characteristics based, at least in part, on which a device will transition in association with another state and its desired value. Some additional states may be used to designate values for characteristics such as trajectories, gradients, accelerations, rates of change, and other characteristics. In some examples, some additional states may be set to various specific values, maximum, minimum, or average values, or may indicate mathematical or other relationships, such as linear relationships or more complex mathematical relationships. As will be described in the example below, a desired value for an additional state may be received from an application and then indicated to the device in order to control the transitioning of the device.

For example, in the case of a motor, an application may request two desired states for the motor: a MotorDesiredRate and a StartProfile. The StartProfile may be used to indicate how the motor will transition from a current speed to the desired speed of the MotorDesiredRate. In one particular example, these two desired states may be set as shown below:

MotorDesiredRate=100 rpm
StartProfile=10 milliamperes per second (ma/s)

The device may then respond with the following reported actual states:

MotorDesiredRate=100 rpm
StartProfile=10 ma/s
CurrentRate=0 rpm

The above reporting from the device indicates that the actual state for the MotorDesiredRate has been set to 100 rpm, which matches the desired state for the MotorDesiredRate of 100 rpm. The above reporting from the device also indicates that the actual state for the StartProfile has been set to 10 ma/s, which matches the desired state for the StartProfile of 10 ma/s. Additionally, the reported CurrentRate state indicates that the motor's actual current rate is 0 rpm. Thus, even though the motor has not yet spun up, the device's reported actual state for both MotorDesiredRate and StartProfile match the desired states. The device may then send updates of its CurrentRate to inform the service how fast the motor is currently running as it transitions from 0 rpm to 100 rpm.

Figure 14:
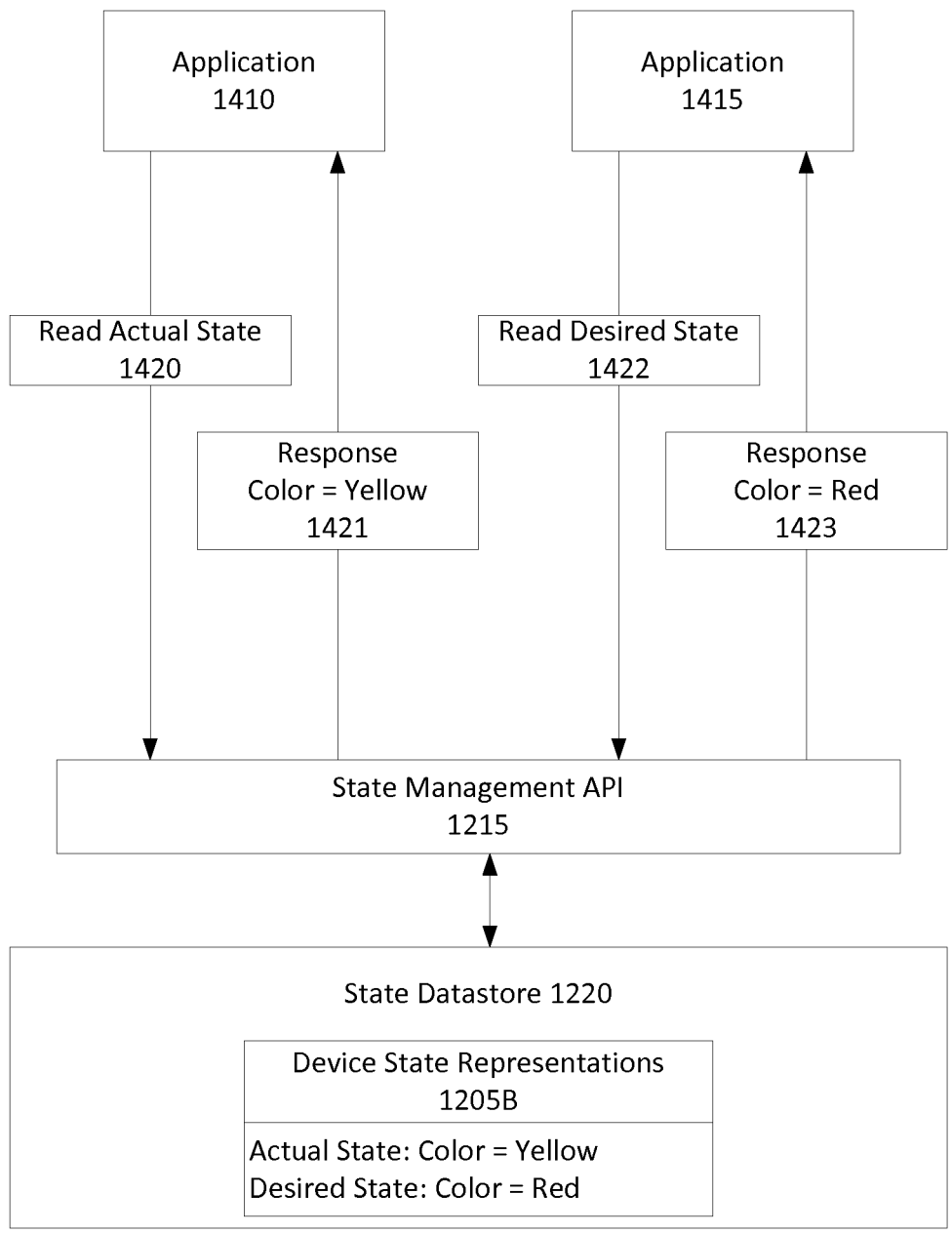
FIG. 14 is a diagram depicting example actual state and desired state read requests.

As set forth above, in addition to requesting a state change (e.g., by issuing a write request) to the device state representations, applications may also request to obtain states (e.g., by issuing a read request) from the device state representations. FIG. 14 is a diagram depicting example actual state and desired state read requests. In particular, as shown in FIG. 14, state data store 1220 includes device state representations 1205B for device 1240, which include an actual state representation that indicates the Color=Red state and a desired state representation that indicates the Color=Yellow. As also shown in FIG. 14, applications 1410 and 1415 may each issue read requests to read from device state representations 1205B. In particular, application 1410 may issue a read request 1420 to read the actual state of device 1240. The actual state read request 1420 may be received and processed by state management API 1215, which may read the actual state representation of Color=Yellow from the state representations 1205B within state data store 1220. A response 1421 indicating the actual state representation value of Color=Yellow may then be returned to application 1410. Additionally, application 1415 may issue a read request 1422 to read the desired state of device 1240. The desired state read request 1422 may be received and processed by state management API 1215, which may read the desired state representation of Color=Red from the state representations 1205 within state data store 1220. A response 1423 indicating the desired state representation value of Color=Red may then be returned to application 1415.

It is noted that, in the example of FIG. 14, both actual state read request 1420 and desired state read request 1422 may be processed without directly engaging the device 1240. Thus, it can be seen that state data store 1220 and the device representations stored therein may allow applications to obtain the actual and/or desired states of requested devices at any time without the need to contact the requested devices in response to each state read request. This may, for example, reduce the amount of communications usage of other computing resources, as well as reducing the time and expense required to obtain and provide indications of device states to requesting parties. Additionally, as noted above, due to limited power supplies and other limitations, connected devices may sometimes not always be reachable using network communications, and the use of stored device state representations may allow indications of device states to be obtained and provided, even when the devices themselves may be temporarily unreachable. It is further noted that, in some examples, in addition to current states, historical states may also be stored within state data store 920 and provided upon request. For example, a listing of device state over one or more time periods may be requested and provided to a requesting application, without the need to directly engage the underlying physical device.

In some examples, relationships between a physical device and its device shadow, including, for example, its respective device representations, may be configurable by, for examples, developers and other parties. For example, in some cases, rules may be set that may define under which conditions and/or in response to which API calls a physical device may be directly engaged. For example, an amount of time may be specified that indicates a threshold time period beyond which a cached state representation may considered be unreliable or may otherwise trigger direct engagement of a physical device. To illustrate this concept, consider the scenario in which a particular sensor reading from a device may be reported by a device and saved in its respective device state representation. Now suppose that the sensor reading from the device may be considered out-of-date or unreliable after a time period of three hours. In this scenario, a three hour threshold time period may sometimes be defined after which it is required for the device to be directly engaged in response to state read requests. For example, when a read request is issued, by an application, to obtain the state of the device, it may be determined how long it has been since the device's state representation was last updated. If the device's state representation has been updated within the past three hours, then the device state indicated by the device's stored state representation may be returned to the application without directly engaging or contacting the device. By contrast, if the device's state representation has not been updated within the past three hours, then the device may be contacted and instructed to report its current state. Upon receiving the reported current state, the device's state representation may be updated to indicate the current state and an indication of the current state may also be reported back to the requesting application. In some examples, in order to allow an easy and efficient determination of a time period since a device state representation was last updated, a timestamp or other indication of an update time of a device state representation may be stored within the device state representation or at an accessible location.

Figure 15A:
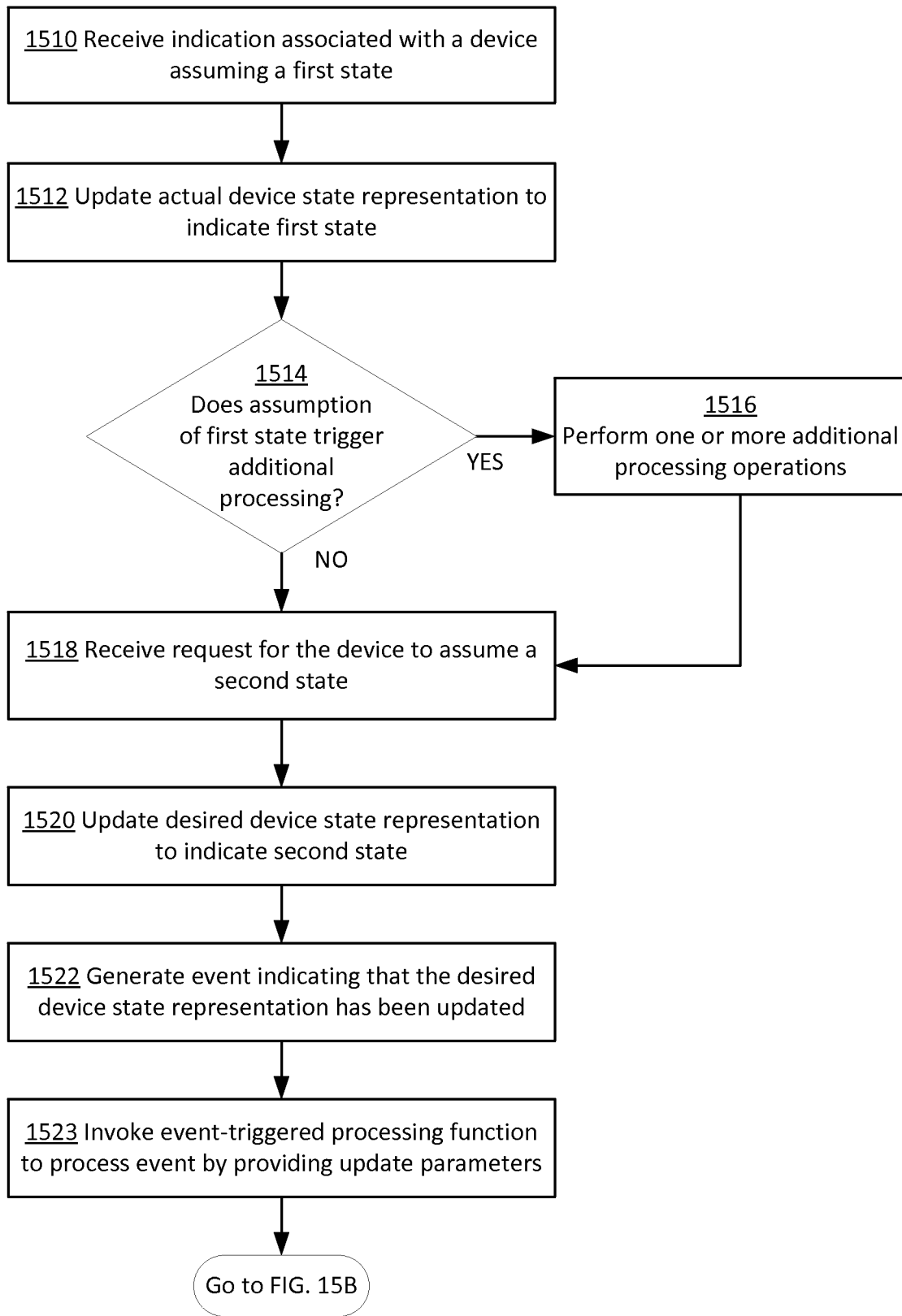
FIGS. 15A-B depict flow diagrams of example processes for managing device states.
Figure 15B:
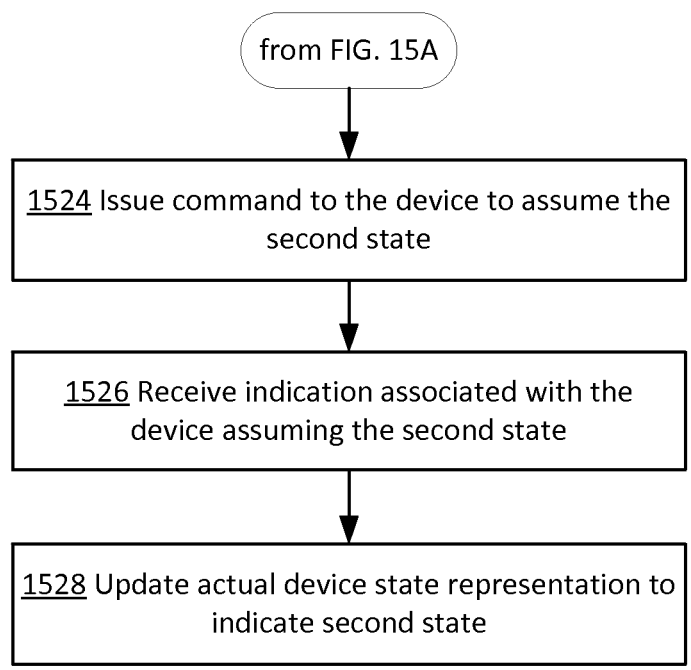

Referring now to FIGS. 15A-B, some example processes for managing device states will now be described in detail. The processes of FIGS. 15A-B may, in some examples, be performed by a device management service that may, for example, manage and report device states, enable control of devices, and perform other operations. The connected devices may connect to the service intermittently over one or more networks. As shown in FIG. 15A, at operation 1510, an indication may be received associated with a device assuming a first state. As set forth above, in one particular example, the device may be light that has assumed a particular color state, such as a Color=Yellow state. As also set forth above, the indication may be reported by a device, such as device 1240 of FIGS. 12 and 13, to a gateway, such as gateway 1230 of FIGS. 12 and 13. In some examples, the indication received at operation 1510 may include data provided by the device using a binary format.

At operation 1512, an actual device state representation associated with the device may be updated to indicate the first state. As set forth above, the device management service may maintain a number of device state representations associated with the connected devices and perform operations based, at least in part, on the device state representations. The device state representations may include, for example, actual device state representations and desired device state representations that indicate actual and desired device states, respectively, for the connected devices. The device state representations may be stored in one or more key value data stores separate from and/or external to the connected devices. In some examples, operation 1512 may include converting, by the device gateway, information within the indication received at operation 1510 into a different format that may be employed by service components, such as a JSON format. Operation 1512 may also include providing the converted information, which may include a device identifier for the device and an indication of the assumption of the first state, to a state management API, such as state management API 1215 of FIGS. 12 and 13, which may, in turn, update a state data store that includes the device state representations, such as state data store 1220 of FIGS. 12 and 13. As set forth above, the state data store may, in some examples, by a key value data store in which device state representations are organized according to key values, such as device identifiers or other key value information. In one particular example, when the first state is the Color=Yellow state, the actual state representation for the device may be updated at operation 1512 to indicate a state of Color=Yellow, such as depicted in device state representations 1205A of FIG. 12.

At operation 1514, it is determined whether the device's assumption of the first state, at least in part, triggers additional processing, such as additional processing by the device state management service. Some example processes for determination of processing triggered based on information provided by a device are described in detail above with respect to FIG. 8 and are not repeated here. In some examples, the determination of operation 1514 may be performed, in whole or in part, by a gateway component based on information stored in or otherwise provided by a device registry, such as device registry 142 as described above. For example, the device registry may store rules or other information associated with processing operations for devices and/or classes of devices that may be triggered based, at least in part, on various states, events, and/or other conditions. The device registry may also store information identifying various functions, such as event-triggered processing functions, to invoke based, at least in part, on various states, events, and/or other conditions. As set forth above, the use of event-triggered computing functions may, in some examples, reduce costs and improve efficiency by consuming computing resources only at times when they are invoked. In some examples, additional processing may be triggered to identify errors, calculate mean, maximum, and minimum values, and other operations. As another example, additional processing may be triggered to identify safety concerns and other problematic conditions, such as multiple readings that fall outside of a desired range.

If, at operation 1514, it is determined that additional processing has been triggered, then, at operation 1516, one or more additional processing operations may be performed. Some example processes for performance of processing operations triggered based on information provided by a device are described in detail above with respect to FIG. 8 and are not repeated here. In some examples, performance of the additional processing may include invoking one or more functions for processing of the request, such as one or more event-triggered processing functions. As set forth above, such functions may be identified, at operation 1512, based on information stored in a device registry. In some examples, upon completion of the additional processing, a device gateway may receive an acknowledgment of processing and transmit the acknowledgement back to the device.

Upon performance of the additional processing (or if no additional processing was required), the process may then proceed to operation 1518, at which a request may be received for the device to assume a second state that is different from the first state. The request may, for example, be received from an application, such as application 1210 of FIGS. 12 and 13, and received by a state management API, such as state management API 1215 of FIGS. 12 and 13. The request may, for example, identify the device using its respective device identifier and also provide an indication of the desired state. Next, at operation 1520, a desired device state representation for the device may be updated to identify the second state. In some examples, the state management API may update a state data store that includes the desired device state representations. In one particular example, when the second state is the Color=Red state, the desired state representation for the device may be updated at operation 1520 to indicate a state of Color=Red, such as depicted in device state representations 1205B of FIG. 12.

At operation 1522, an event may be generated indicating that the desired device state representation has been updated. In some examples, the event may be generated by a state data store in which the device state representations are stored. At operation 1523, an event-triggered processing function invoked to process the event by providing update parameters for issuing of a state update command to the device. For example, an event triggered processing function, such as function 1225 of FIG. 12, may compare the actual and desired state representation values for the device and may determine that the desired state (i.e., the second state) differs from the actual state (i.e., the first state). The event-triggered processing function may then, for example, provide, to a gateway, state change parameters indicating the device identifier for device, the desired state (i.e., the second state), and the actual state (i.e., the first state).

The process may then proceed to FIG. 15B, and, more specifically, to operation 1524, at which a command may be issued to the device to assume the second state. As set forth above, in some examples, a gateway may generate the state change command by converting information within the state change parameters into a different format. For example, the gateway may convert the state change parameters 1254 from a JSON formatted message into a binary format. The gateway may send the state change command to the device, which may, in turn, change its state to the second state.

At operation 1526, an indication may be received associated with the device assuming the second state. The indication may include information reported by the device to a device gateway using a binary format, which may be converted by the device format to a JSON or other format. At operation 1528, the actual device state representation for the device may be updated to indicate the second state. Operation 1528 may include, for example, any, or all, of the details described above with respect to operation 1512, which are not repeated here. In one particular example, when the second state is the Color=Red state, the actual state representation for the device may be updated at operation 1528 to indicate a state of Color=Red, such as depicted in device state representations 1205C of FIG. 13. It is further noted that, although not explicitly depicted in FIG. 15B, it may be determined whether the device's assumption of the second state triggers additional processing, such as described above with respect to operations 1514 and 1516 relative to the assumption of the first state.

Figure 16:
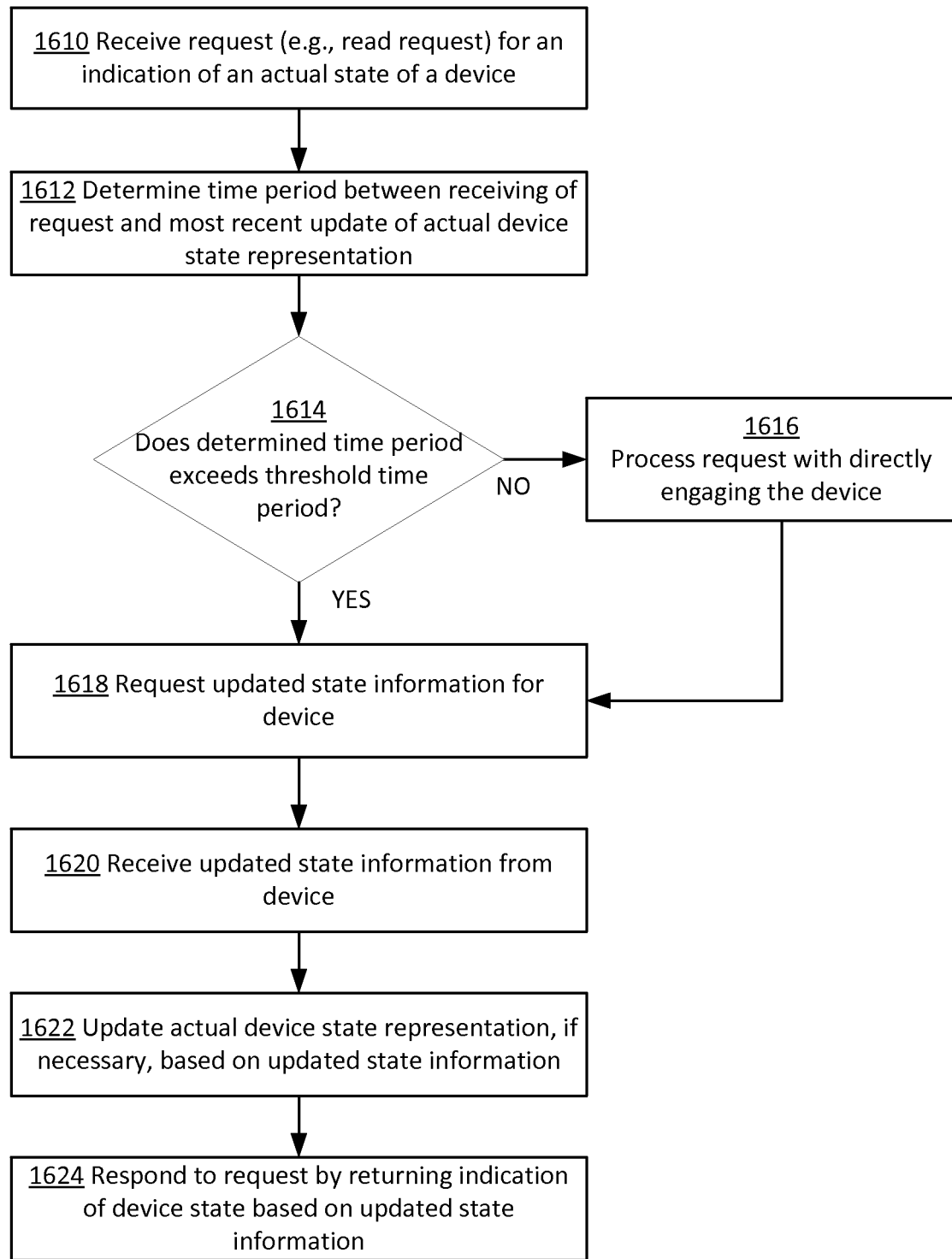
FIG. 16 depicts a flow diagram of an example process for responding to a request for device state information.

As set forth above, in addition to requesting device state changes such as described above with respect to FIGS. 15A-B, applications may also request to read or otherwise obtain an indication of a state of a device. Referring now to FIG. 16, an example process for responding to a request for device state information will now be described. At operation 1610, a request for an indication of an actual state of a device, such as a read request, may be received, for example, from an application. At operation 1612, a time period between the receiving of the request (i.e., at operation 1610) and a most recent update of the actual device state representation for the device is determined. In some examples, when a device state representation is updated, a timestamp or other indication of the time of the update may be stored in the representation or at an accessible location. This timestamp or time indication may allow the period determined at operation 1612 to be efficiently ascertained.

At operation 1614, it is determined whether the time period determined at operation 1614 exceeds a threshold time period. In some examples, one or more devices and/or classes of devices may have an associated threshold time period associated with engagement of the devices to request updated state information. For example, this threshold time period may sometimes be determined based on factors such as a frequency with which a device changes its state and/or a time period after which previously reported device states may be considered unreliable and/or unsafe. In some examples, the threshold time period for the device may be obtained from a device registry 142 using procedures such as those described above. If the time period determined at operation 1612 does not exceed the threshold time period, then, at operation 1616, the request received at operation 1610 may be processed without directly engaging the device. For example, the request may be processed by obtaining and returning an indication of the device state that is stored in the actual device state representation without requesting updated device state information from the device.

If, on the other hand, the time period determined at operation 1612 exceeds the threshold time period, then, at operation 1618, updated state information may be requested for the device. For example, the device may be contacted via a device gateway using procedures such as those described above. At operation 1620, updated device information may be received from the device. The updated device information may include an indication of a recently assumed different state or confirmation that the device has maintained its prior state. At operation 1622, the actual device state representation is updated, if necessary, based on the updated state information. For example, if the device has recently assumed a different state, then the actual device state representation may be updated to reflect the different state and to reflect an updated timestamp. By contrast, if the device has maintained its prior state then the actual device state representation may continue to reflect the prior state but may update the timestamp to reflect receipt of the updated device information. At operation 1624, the request may be responded to by returning an indication of the device state based on the updated state information. For example, the state reported by the device in the updated state information (e.g., either a recently assumed different state or a maintaining of a prior state) may be returned to the requesting application.

Figure 17:
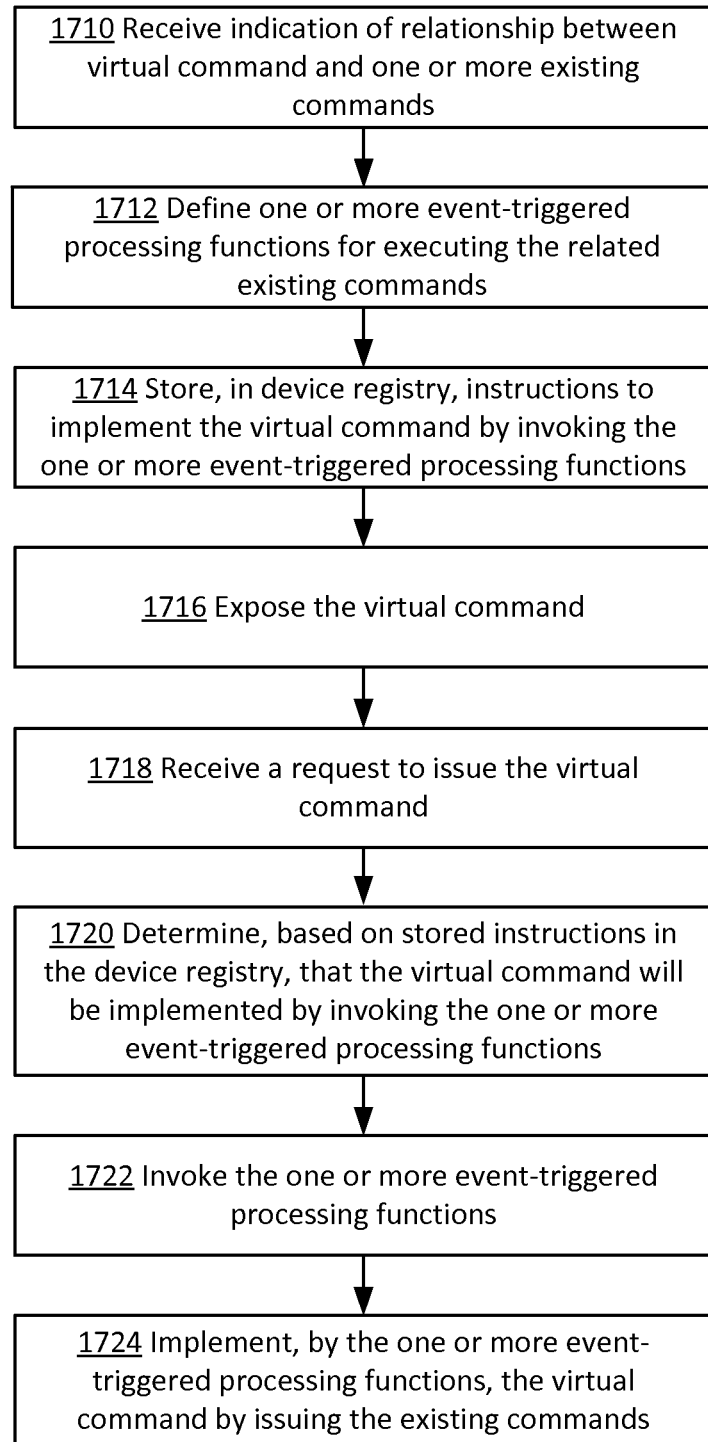
FIG. 17 depicts a flow diagram of an example process for implementing a virtual command.

As set forth above, the techniques described herein may allow applications to be controlled using, for example, state change requests and other commands. In some examples, the techniques described herein may also allow one or more virtual commands to be defined, exposed, and requested for control of devices. Virtual commands may be formulated based on one or more existing device commands that are executable by a device. As set forth above, in one example, a virtual "blink" command for a light could include combinations of existing "on" and "off" commands called in succession to generate a blinking effect. In some examples, a virtual command may be a command associated with an updated firmware version that may be formulated based on one or more existing commands associated with a prior firmware version, thereby effectively allowing an updated firmware version command to be issued for devices that are still executing the prior firmware version. Referring now to FIG. 17, an example process for implementing of a virtual command will now be described in detail. In particular, at operation 1710, an indication may be received of a relationship between a virtual command and one or more existing commands, which are commands that are executable by a device. For example, at operation 1710, an indication may be received indicating that a "blink" command for a light could include an alternation between ten existing "on" commands and ten existing "off" commands in succession. In some examples, the received indication may specify or indicate one or more particular devices and/or classes of devices for which the virtual command is to be exposed.

At operation 1712, one or more event-triggered processing functions may be defined for executing the one or more existing commands, for example, based, at least in part, on their relationship with the virtual command. For example, an event-triggered processing function may be defined for the "blink" command that alternates between execution of existing "on" commands and ten existing "off" commands in succession. At operation 1714, instructions may be stored, in a device registry, such as device registry 142, to implement the virtual command by invoking the one or more event-triggered processing functions. These instructions may be associated, in the device registry, with each device and/or class of devices for which the virtual command is to be exposed.

At operation 1716, the virtual command may be exposed. For example, an API call for requesting issuance of the virtual command may be exposed to various users of a device state management service. In some examples, the virtual command may be exposed using a directory or other informational organization structure that may allow users to look up virtual commands and other device management features that are exposed for various devices and/or classes of devices. At operation 1718, a request to issue the virtual command is received. For example, an application may issue an API call that may be received by a state management API. The request may, for example, provide one or more device identifiers for one or more devices to which the virtual is to be issued.

At operation 1720, it may be determined, based, at least in part, on the instructions stored in the device registry, that the requested virtual command will be implemented by invoking the one or more event-triggered processing functions. In some examples, the state management API and/or other components may access the device registry and may provide information such as a device identifier, a device class identifier and/or an identifier of the virtual command in order to access the stored instructions within the device registry that identify the one or more event-triggered processing functions. At operation 1722, the one or more event-triggered processing functions may be invoked, for example, by the state management API and/or other components. At operation 1724, the one or more event-triggered processing functions may implement the virtual command by issuing the related existing commands. The related existing commands may be issued to one or devices identified by the request received at operation 1718. The related existing commands may be issued based, at least in part, on the relationship between the virtual command and the existing commands. For example, if the requested virtual command is the "blink" command described above, then the one or more event-triggered processing functions may alternate between issuing ten existing "on" commands and ten existing "off" commands in succession for the identified device. The commands may be issued by, for example, providing instructions to a device gateway that may be used to communicate with the identified device. It is once again noted that the use of event-triggered processing functions may, in some examples, reduce costs and improve efficiency by consuming computing resources only at times when they are invoked. However, as should be appreciated, the described virtual command implementation techniques are not limited to the use of event-triggered processing functions and one or more other processing functions may be employed as an alternative, or in addition to, event-triggered processing functions.

Example Processing Architecture

Figure 18:
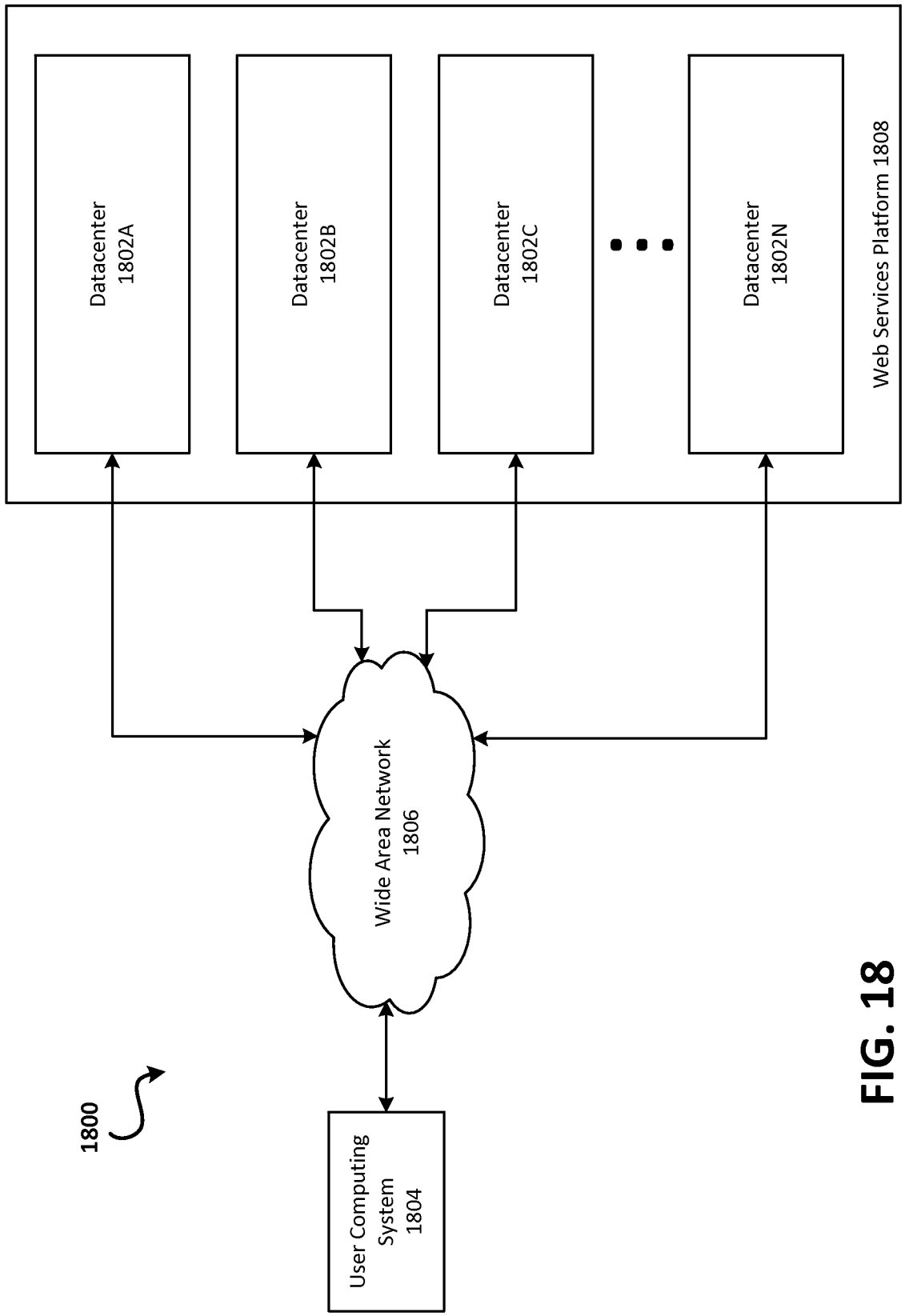
FIG. 18 depicts an example computing arrangement for implementing services accessible to an example device.
Figure 19:
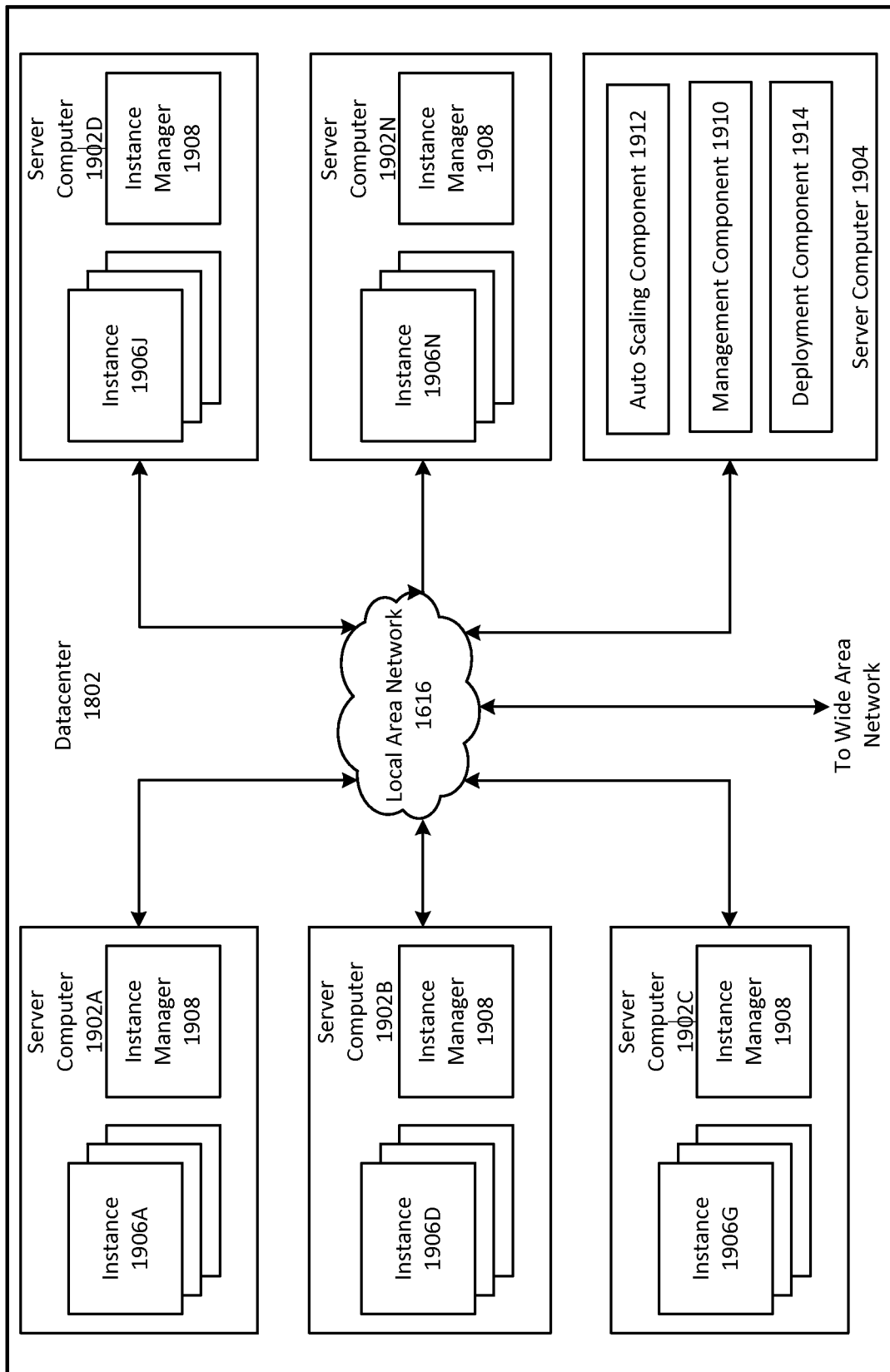
FIG. 19 depicts an example computing arrangement for implementing services accessible to an example device.

Devices 130 access computing service 110 via network 120. In some embodiments, network 120 may comprise the Internet or World Wide Web and service 110 may be considered a cloud or web service. FIGS. 18 and 19 depict example operating environments that might be used to implement service 110 and its various components. Generally, FIG. 18 depicts a web services platform that comprises a plurality of datacenters. FIG. 19 depicts a datacenter that comprises a plurality of computers.

Turning to the details of FIG. 18, this figure depicts an example of a suitable computing environment in which embodiments described herein may be implemented. A cloud service provider (such as web services platform 1808) may configure the illustrated computing environment to host virtual clouds of entities and to enable communication paths between these virtual clouds that may otherwise be isolated. In particular, FIG. 18 is a system and network diagram that shows an illustrative operating environment 1800 that includes a web services platform 1808 for implementing virtual clouds and for providing on-demand access to computer resources, such as virtual machine instances. Web services platform 1808 can provide computer resources for executing applications on a permanent or an as-needed basis and may be configured as a private network. These computer resources may include various types of resources, such as data processing resources, data storage resources, data communication resources, and the like. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 1808 may be enabled by one or more datacenters 1802A-1802N, which may be referred herein singularly as "datacenter 1802" or in the plural as "datacenters 1802." Datacenters 1802 may be facilities that house and operate computer systems and associated components and may include redundant and backup power, communications, cooling, and security systems. Datacenters 1802 may be located in a same geographical area, such as in a same facility, and may be interconnected using private networks, such as high-speed fiber optic networks, controlled and managed by a service provider of web services platform 1808. Datacenters 1802 may also be distributed across geographically disparate locations and may be interconnected in part using public networks, such as the Internet. One illustrative configuration for datacenter 1802 that implements the concepts and technologies disclosed herein is described below with regard to FIG. 19.

Entities of web services platform 1808 may access the computer resources provided by datacenters 1802 over a Wide Area Network (WAN) 1806. Although a WAN is illustrated in FIG. 18, it should be appreciated that a Local Area Network (LAN), the Internet, or any other networking topology known in the art that connects datacenters 1802 to remote entities and other users may be utilized. It should also be appreciated that combinations of such networks may also be utilized.

An entity or other entities that are users of web services platform 1808 may utilize a computing system 1804 to access the computer resources provided by datacenters 1802. User computing system 1804 comprises a computer capable of accessing web services platform 1808, such as a server computer, a desktop or laptop personal computer, a tablet computer, a wireless telephone, a PDA, an e-reader, a game console, a set-top box, an automobile, an automobile system, a home appliance, a manufacturing device or sensor, a building control system, a farming instrument, or any other computing node or thing that is able to communicate with data center 1802. In an example scenario, computing system 1804 may correspond, for example, devices 130 described above.

In an example scenario, a particular user computing system 1804 may be utilized to configure aspects of the computer resources provided by web services platform 1808. In this regard, web services platform 1808 may provide a web interface through which aspects of its operation may be configured through the use of a web browser application program executing on user computing system 1804. Alternatively, a stand-alone application program executing on user computing system 1804 may access an application programming interface (API) exposed by web services platform 1808 for performing the configuration operations. Other mechanisms for configuring the operation of web services platform 1808, including launching new virtual machine instances on web services platform 1808, may also be utilized.

According to embodiments disclosed herein, capacities of purchased computer resources provided by web services platform 1808 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 1808 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 19 depicts a computing system diagram that illustrates one configuration for datacenter 1802 that implements web services platform 1808. The example datacenter 1802 shown in FIG. 19 may include several server computers 1902A-1902N, which may be referred herein singularly as "server computer 1902" or in the plural as "server computers 1902," for providing computer resources for hosting virtual clouds and for executing applications. Server computers 1902 may be standard tower or rack-mount server computers configured appropriately for providing the computer resources described above. For instance, in one implementation server computers 1902 may be configured to provide instances 1906A-1906N of computer resources.

Instances 1906A-1906N, which may be referred herein singularly as "instance 1906" or in the plural as "instances 1906," may be virtual machine instances. As known in the art, a virtual machine instance is an instance of a software implementation of a machine (i.e., a computer) that executes programs like a physical machine. In the example of virtual machine instances, each server 1902 may be configured to execute an instance manager 1908 capable of executing the instances. Instance manager 1908 may be a hypervisor or another type of program configured to enable the execution of multiple instances 1906 on a single server 1902, for example. As discussed above, each of instances 1906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1802 shown in FIG. 19 may also include a server computer 1904 reserved for executing software components for managing the operation of datacenter 1802, server computers 1902, and instances 1906. In particular, server computer 1904 may execute a management component 1910. As discussed above, working between FIGS. 18 and 19, an entity of web services platform 1808 may utilize user computing system 1804 to access management component 1910 to configure various aspects of the operation of web services platform 1808 and instances 1906 purchased by the entity. For example, the entity may purchase instances and make changes to the configuration of the instances. The entity may also specify settings regarding how the purchased instances are to be scaled in response to demand. The entity may also provide requests to launch instances to management component 1610.

As also described briefly above, an auto scaling component 1912 may scale instances 1906 based upon rules defined by an entity of web services platform 1908. For example, auto scaling component 1912 may allow an entity to specify scale up rules for use in determining when new instances should be instantiated and scale down rules for use in determining when existing instances should be terminated.

As discussed briefly above, datacenter 1802 may also be configured with a deployment component 1914 to assist entities in the deployment of new instances 1906 of computer resources. Deployment component 1914 may receive a configuration from an entity that includes data describing how new instances 1906 should be configured. For example, the configuration may specify one or more applications that should be installed in new instances 1906, provide scripts and/or other types of code to be executed for configuring new instances 1906, provide cache warming logic specifying how an application cache should be prepared, and other types of information.

Deployment component 1914 may utilize the entity-provided configuration and cache warming logic to configure, prime, and launch new instances 1906. The configuration, cache warming logic, and other information may be specified by an entity using management component 1910 or by providing this information directly to deployment component 1914. Other mechanisms may also be utilized to configure the operation of deployment component 1914.

In the example datacenter 1802 shown in FIG. 19, an appropriate LAN 1916 may be utilized to interconnect server computers 1902A-1902N and server computer 1904. LAN 1916 may also be connected to WAN 1806 illustrated in FIG. 18. It should be appreciated that the network topology illustrated in FIGS. 18 and 19 has been greatly simplified and that many more networks and networking devices may be utilized to interconnect the various computing systems disclosed herein. Appropriate load balancing devices or software modules may also be utilized for balancing a load between each of datacenters 1802A-1802N, between each of server computers 1902A-1902N in each datacenter 1802 and between instances 1906 purchased by each entity of web services platform 1808. These network topologies and devices should be apparent to those skilled in the art.

It should be appreciated that datacenter 1802 described in FIG. 19 is merely illustrative and that other implementations may be utilized. In particular, functionality described herein as being performed by management component 1910, auto scaling component 1912, and deployment component 1914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 20:
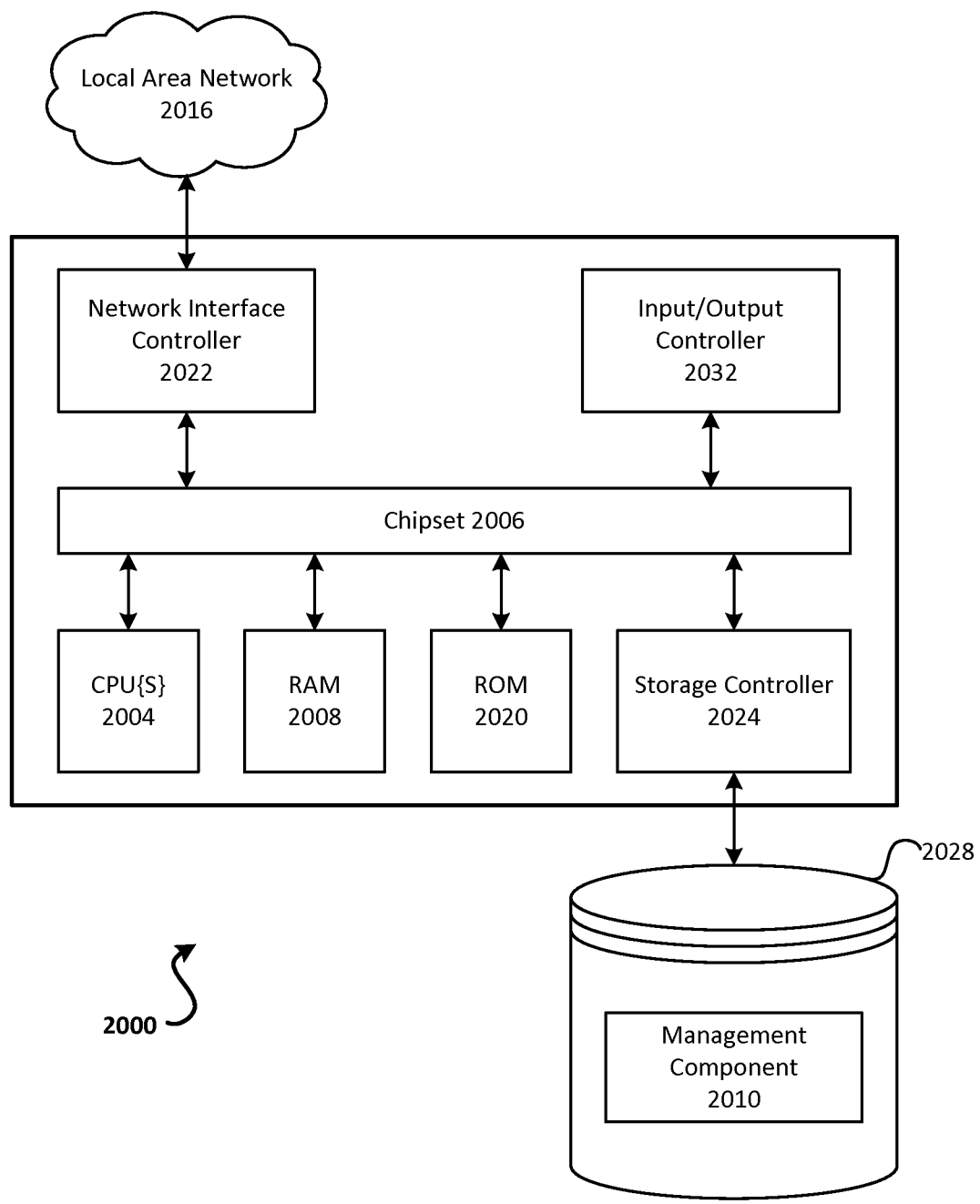
FIG. 20 depicts an example computing system that may be used in some embodiments.

FIG. 20 depicts an example computer architecture for a computing system 2000 capable of executing software for performing operations as described above in connection with FIGS. 1-19. The computer architecture shown in FIG. 20 illustrates a conventional server computer, workstation, desktop computer, laptop, tablet, network appliance, PDA, e-reader, digital cellular phone, or other computing node, and may be utilized to execute any aspects of the software components presented herein described as executing on servers 140, 142, 144, 146, 150, 220, 230, and 240, on devices 130, within datacenters 1802A-1802N, on server computers 1902A-1902N, or on any other computing system mentioned herein.

Computer 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. CPUs 2004 may be standard programmable processors that perform arithmetic and logical operations necessary for the operation of computer 2000.

CPUs 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 2006 may provide an interface between CPUs 2004 and the remainder of the components and devices on the baseboard. Chipset 2006 may provide an interface to a random access memory (RAM) 2008 used as the main memory in computer 2000. Chipset 2006 may further provide an interface to a computer-readable storage medium, such as a read-only memory (ROM) 2020 or non-volatile RAM (NVRAM) (not shown), for storing basic routines that may help to start up computer 2000 and to transfer information between the various components and devices. ROM 2020 or NVRAM may also store other software components necessary for the operation of computer 2000 in accordance with the embodiments described herein.

Computer 2000 may operate in a networked environment using logical connections to remote computing nodes and computer systems through LAN 2016. Chipset 2006 may include functionality for providing network connectivity through a network interface controller (NIC) 2022, such as a gigabit Ethernet adapter. NIC 2022 may be capable of connecting the computer 2000 to other computing nodes over LAN 2016. It should be appreciated that multiple NICs 2022 may be present in computer 2000, connecting the computer to other types of networks and remote computer systems.

Computer 2000 may be connected to a mass storage device 2028 that provides non-volatile storage for the computer. Mass storage device 2028 may store system programs, application programs, other program modules, and data, which have been described in greater detail herein. Mass storage device 2028 may be connected to computer 2000 through a storage controller 2024 connected to chipset 2006. Mass storage device 2028 may consist of one or more physical storage units. Storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 2000 may store data on mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 2028 is characterized as primary or secondary storage and the like.

For example, computer 2000 may store information to mass storage device 2028 by issuing instructions through storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 2000 may further read information from mass storage device 2028 by detecting the physical states or characteristics of one or more particular locations within the physical storage units.

In addition to mass storage device 2028 described above, computer 2000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 2000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 2028 may store an operating system utilized to control the operation of the computer 2000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 2028 may store other system or application programs and data utilized by computer 2000, such as management component 2010 and/or the other software components described above.

Mass storage device 2028 or other computer-readable storage media may also be encoded with computer-executable instructions, which, when loaded into computer 2000, transforms the computer from a general-purpose computing system into a special-purpose computer capable of implementing the embodiments described herein. These computer-executable instructions transform computer 2000 by specifying how CPUs 2004 transition between states, as described above. Computer 2000 may have access to computer-readable storage media storing computer-executable instructions, which, when executed by computer 2000, may perform operating procedures described above in connection with FIGS. 1-10.

Computer 2000 may also include an input/output controller 2032 for receiving and processing input from a number of input devices, such as a keyboard, a mouse, a touchpad, a touch screen, an electronic stylus, or other type of input device. Similarly, input/output controller 2032 may provide output to a display, such as a computer monitor, a flat-panel display, a digital projector, a printer, a plotter, or other type of output device. It will be appreciated that computer 2000 may not include all of the components shown in FIG. 20, may include other components that are not explicitly shown in FIG. 20, or may utilize an architecture completely different than that shown in FIG. 20.

As described herein, a computing node may be a physical computing node, such as computer 2000 of FIG. 20. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for operating a service that manages device states comprising:
   one or more processors;
   computing memory having stored therein computer instructions that, upon execution by the one or more processors, cause at least the computing system to at least:
      receive an indication associated with a first device assuming a first device state, wherein the first device is included in a plurality of devices that connect to the service intermittently over one or more networks;
      update a first representation of an actual state of the first device to indicate the first device state, wherein the first representation is included in a plurality of representations of device states associated with the plurality of devices, and wherein the service maintains the plurality of representations of device states and performs operations based, at least in part, on the plurality of representations of device states;
      receive, from a second device, a request for the first device to assume a second state that is different from the first device state;
      update, based on the request, a second representation of a desired state of the first device to indicate the second state, wherein the second representation is also included in the plurality of representations of device states, and wherein the second state is not the actual state of the first device when the second representation is updated, wherein the first representation and the second representation are separate parameters stored by the service;
      send, based on the request, instructions to the first device to assume the second state;
      receive an indication associated with the first device assuming the second state based on the instructions; and
      update the first representation of the actual state of the first device to indicate the second state.

2. The computing system of claim 1, wherein the computer instructions, upon execution by the one or more processors, further cause at least the computing system to at least:
   determine, based at least in part on the first device assuming the first device state, to perform one or more processing operations; and
   invoke at least one event-triggered processing function to perform the one or more processing operations.

3. The computing system of claim 1, wherein the computer instructions, upon execution by the one or more processors, further cause at least the computing system to at least:

receive a request for an indication of the actual state of the first device;

determine a state indicated by the first representation of the actual state of the first device; and return an indication of the state indicated by the first representation of the actual state of the first device.

4. The computing system of claim 3, wherein the request for the indication of the actual state of the first device is processed without contacting the first device.

5. The computing system of claim 1, wherein the plurality of representations of device states are stored in one or more key value data stores external to the plurality of devices.

6. One or more non-transitory computer-readable storage media having stored thereon computer instructions that, upon execution by one or more processors, at least cause a computing system to perform operations comprising:

receiving, by a service, an indication of a relationship between a virtual command and one or more other commands that are executable by at least a first device of a plurality of devices that connect to the service intermittently over one or more networks, wherein the virtual command is associated with an updated firmware version, and wherein the one or more other commands are associated with a firmware version prior to the updated firmware version;

defining, by the service, one or more processing functions for issuing the one or more other commands based, at least in part, on the relationship;

storing, by the service, instructions to implement the virtual command by invoking the one or more processing functions;

receiving, by the service, a request to issue the virtual command to the first device;

determining, by the service, based on the instructions stored by the service, that the virtual command is implemented by invoking the one or more processing functions; and invoking, by the service, the one or more processing functions, wherein the one or more processing functions implement the virtual command by issuing the one or more other commands to the first device based, at least in part, on the relationship.

7. The one or more non-transitory computer-readable storage media of claim 6, wherein the one or more processing functions comprise one or more event-triggered processing functions.

8. The one or more non-transitory computer-readable storage media of claim 6, wherein the instructions to implement the virtual command by invoking the one or more processing functions are stored in a device registry.

9. The one or more non-transitory computer-readable storage media of claim 6, wherein the operations further comprise:

exposing an application programming interface call for requesting issuance of the virtual command.

10. The one or more non-transitory computer-readable storage media of claim 6, wherein the operations further comprise:

receiving an indication associated with the first device assuming a first device state;

updating a first representation of a state of the first device to indicate the first device state, wherein the first representation is included in a plurality of representations of device states associated with the plurality of devices, and wherein the service maintains the plurality of representations of device states and performs operations based, at least in part, on the plurality of representations of device states;

receiving a request for an indication of the state of the first device;

determining the state indicated by the first representation of the state of the first device; and returning an indication of the state indicated by the first representation of the state of the first device.

11. The one or more non-transitory computer-readable storage media of claim 10, wherein the plurality of representations of device states are stored in one or more key value data stores external to the plurality of devices.

12. The one or more non-transitory computer-readable storage media of claim 10, wherein the request for the indication of the state of the device is processed without contacting the first device.

13. A computer-implemented method for operating a service that manages device states comprising:

receiving an indication associated with a first device assuming a first device state, wherein the first device is included in a plurality of devices that connect to the service intermittently over one or more networks;

updating a first representation of an actual state of the first device to indicate the first device state, wherein the first representation is included in a plurality of representations of device states associated with the plurality of devices, and wherein the service maintains the plurality of representations of device states and performs operations based, at least in part, on the plurality of representations of device states;

receiving, from a second device, a request for the first device to assume a second state that is different from the first device state;

updating, based on the request, a second representation of a desired state of the first device to indicate the second state, wherein the second representation is also included in the plurality of representations of device states, and wherein the second state is not the actual state of the first device when the second representation is updated, wherein the first representation and the second representation are separate parameters stored by the service;

sending, based on the request, instructions to the first device to assume the second state;

receiving an indication associated with the first device assuming the second state based on the instructions; and updating the first representation of the actual state of the first device to indicate the second state.

14. The computer-implemented method of claim 13, further comprising:

determining, based at least in part on the first device assuming the first device state, to perform one or more processing operations; and invoking at least one event-triggered processing function to perform the one or more processing operations.

15. The computer-implemented method of claim 13, further comprising:

receiving a request for an indication of the actual state of the first device;

determining a state indicated by the first representation of the actual state of the first device; and returning an indication of the state indicated by the first representation of the actual state of the first device.

16. The computer-implemented method of claim 15, wherein the request for the indication of the actual state of the first device is processed without contacting the first device.

17. The computer-implemented method of claim 15, further comprising:
- determining a first time period between receiving of the request and a time at which the first representation of the state of the first device was most recently updated;
- comparing the first time period with a second time period associated with engagement of the first device to request updated state information;
- determining that the second time period exceeds the first time period; and
- determining to process the request without directly engaging the first device based, at least in part, on the second time period exceeding the first time period.

18. The computer-implemented method of claim 15, further comprising:
- receiving a second request for an indication of the state of the first device;
- determining a first time period between receiving of the second request and a time at which the first representation of the state of the first device was most recently updated;
- comparing the first time period with a second time period associated with engagement of the first device to request updated state information;
- determining that the first time period exceeds the second time period;
- determining to request an updated state information from the first device based, at least in part, on the first time period exceeding the second time period; and
- returning an indication of the updated state information in response to the second request.

19. The computer-implemented method of claim 13, further comprising:
- receiving a request that indicates a desired value for an additional device state, wherein the additional device state indicates a characteristic based, at least in part, on which the first device transitions in association with the second state; and
- sending an indication of the desired value to the first device.

20. The computer-implemented method of claim 13, wherein the plurality of representations of device states are stored in one or more key value data stores external to the plurality of devices.

* * * * *